US012381324B2

(12) United States Patent
Lee et al.

(10) Patent No.: US 12,381,324 B2
(45) Date of Patent: Aug. 5, 2025

(54) ELECTRONIC DEVICE INCLUDING ANTENNA SWITCH

(71) Applicant: SAMSUNG DISPLAY CO., LTD., Yongin-si (KR)

(72) Inventors: Hyun Jae Lee, Yongin-si (KR); Kiseo Kim, Yongin-si (KR); Sunghwan Kim, Yongin-si (KR); Youngsik Kim, Yongin-si (KR); Youngseok Yoo, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 206 days.

(21) Appl. No.: 18/352,673

(22) Filed: Jul. 14, 2023

(65) Prior Publication Data

US 2024/0106121 A1 Mar. 28, 2024

(30) Foreign Application Priority Data

Sep. 22, 2022 (KR) ........................ 10-2022-0120177

(51) Int. Cl.
*H01Q 1/24* (2006.01)
*H01Q 5/48* (2015.01)

(52) U.S. Cl.
CPC ............... *H01Q 5/48* (2015.01); *H01Q 1/243* (2013.01)

(58) Field of Classification Search
CPC ..... H01Q 1/243; G06F 3/0443; G06F 1/1698; G09G 2370/16
See application file for complete search history.

(56) References Cited

U.S. PATENT DOCUMENTS

| | | | | |
|---|---|---|---|---|
| 10,768,739 | B2 | 9/2020 | Lu et al. | |
| 11,216,108 | B2 | 1/2022 | Kim et al. | |
| 11,216,177 | B2 | 1/2022 | Seomoon et al. | |
| 2018/0188838 | A1 | 7/2018 | An et al. | |
| 2022/0416402 | A1* | 12/2022 | Choi | G06F 3/0443 |
| 2023/0059699 | A1* | 2/2023 | Li | G06F 3/0443 |

FOREIGN PATENT DOCUMENTS

| | | |
|---|---|---|
| KR | 10-2007-0101244 | 10/2007 |
| KR | 10-2018-0079978 | 7/2018 |
| KR | 10-2019-0124607 | 11/2019 |
| KR | 10-2020-0009164 | 1/2020 |
| KR | 10-2021-0042202 | 4/2021 |

* cited by examiner

*Primary Examiner* — Kevin M Nguyen
(74) *Attorney, Agent, or Firm* — F. CHAU & ASSOCIATES, LLC

(57) ABSTRACT

An electronic device includes a display layer in which an active region and a peripheral region proximate to the active region are defined and a controller that is configured to control the display layer. The display layer includes a plurality of pixels, a plurality of antenna patterns that transmit and receive a first signal having a predetermined frequency, and a switch connected to at least one of the plurality of antenna patterns. The controller provides, to the switch, a control signal to control the switch. The switch includes a first line to which a ground voltage is provided, a second line that is floated, a third line to which the first signal is provided, and a fourth line connected to the at least one of the plurality of antenna patterns and electrically connected to the first line, the second line, or the third line based on the control signal.

30 Claims, 13 Drawing Sheets

ELECTRONIC DEVICE INCLUDING ANTENNA SWITCH

CROSS-REFERENCE TO RELATED APPLICATIONS

This application claims priority under 35 U.S.C. § 119 to Korean Patent Application No. 10-2022-0120177, filed on Sep. 22, 2022 in the Korean Intellectual Property Office, the disclosure of which is incorporated by reference herein in its entirety.

TECHNICAL FIELD

Embodiments of the present disclosure described herein relate to an electronic device and, more specifically, to an electronic device including an antenna switch in a peripheral region thereof.

DISCUSSION OF THE RELATED ART

An electronic device may include electronic modules. For example, the electronic device may be a portable terminal or a wearable device, and the electronic modules may include an antenna module, a camera module, or a battery module. The space needed for the electronic modules may be reduced to meet the demands for a slim and compact portable terminal or wearable device. In addition, the number of electronic modules included in the electronic device is increased as the demands for increased functionality grow.

SUMMARY

An electronic device includes a display layer in which an active region and a peripheral region proximate to the active region are defined and a controller that controls the display layer. The display layer includes a plurality of pixels disposed in the active region, a plurality of antenna patterns that are disposed in the peripheral region and that transmit and receive a first signal having a predetermined frequency, and a switch disposed in the peripheral region and connected to at least one of the plurality of antenna patterns. The controller provides, to the switch, a control signal to control the switch. The switch includes a first line to which a ground voltage is provided, a second line that is floated, a third line to which the first signal is provided, and a fourth line connected to the at least one of the plurality of antenna patterns and electrically connected to the first line, the second line, or the third line based on the control signal.

The plurality of antenna patterns may be arranged in a first direction.

The switch may further include a fifth line to which a second signal having a frequency different from the predetermined frequency is provided, and the fourth line may be selectively electrically connected to the fifth line.

The display layer may further include a first auxiliary electrode disposed between neighboring antenna patterns of the plurality of antenna patterns.

The first auxiliary electrode may extend in a first direction and may be spaced apart from the plurality of antenna patterns in the first direction.

The first auxiliary electrode may be floated.

The display layer may further include a first auxiliary switch disposed in the peripheral region and connected to the first auxiliary electrode. The first auxiliary switch may include a first auxiliary line to which a ground voltage is provided, a second auxiliary line that is floated, a third auxiliary line to which a first auxiliary signal having a frequency different from the predetermined frequency is provided, and a fourth auxiliary line connected to the first auxiliary electrode and electrically connected to the first auxiliary line, the second auxiliary line, or the third auxiliary line based on the control signal.

The display layer may further include a second auxiliary electrode disposed in the peripheral region and disposed at one end of each of the plurality of antenna patterns.

The second auxiliary electrode may be spaced apart from the plurality of antenna patterns in a first direction and may extend in a second direction that crosses the first direction.

The second auxiliary electrode may be floated.

The display layer may further include a second auxiliary switch disposed in the peripheral region and connected to the second auxiliary electrode. The second auxiliary switch may include a first auxiliary line to which a ground voltage is provided, a second auxiliary line that is floated, a third auxiliary line to which a first auxiliary signal having a frequency different from the predetermined frequency is provided, and a fourth auxiliary line connected to the second auxiliary electrode and electrically connected to the first auxiliary line, the second auxiliary line, or the third auxiliary line based on the control signal.

Each of the plurality of antenna patterns may include a slot antenna.

The electronic device may further include a sensor layer disposed on the display layer, and the sensor layer may include a plurality of sensing electrodes disposed in the active region and a sub-antenna pattern that is disposed in the active region and that transmits and receives a sub-signal having a predetermined frequency.

The display layer may further include a third auxiliary switch electrically connected to the sub-antenna pattern. The third auxiliary switch may include a first auxiliary line to which a ground voltage is provided, a second auxiliary line that is floated, a third auxiliary line to which the sub-signal is provided, and a fourth auxiliary line connected to the sub-antenna pattern and electrically connected to the first auxiliary line, the second auxiliary line, or the third auxiliary line based on the control signal.

The sub-antenna pattern may have a mesh pattern having a plurality of openings defined therein, and the plurality of pixels may be disposed in the plurality of openings.

The sub-antenna pattern may include a patch antenna.

The plurality of antenna patterns may transmit a first signal and may receive a second signal obtained by reflection of the first signal from an object, and the controller may calculate a distance between the object and the electronic device, based on a time delay and/or a frequency difference of the first signal and the second signal.

An electronic device includes a display layer in which an active region and a peripheral region proximate to the active region are defined, a sensor layer disposed on the display layer, a controller that is configured to generate a control signal, and a plurality of switches that receive the control signal from the controller. The display layer includes a plurality of pixels disposed in the active region and a plurality of antenna patterns that are disposed in the peripheral region and arranged in a first direction and that transmit and receive a first signal having a predetermined frequency. Each of the plurality of switches includes a first line to which a ground voltage is provided, a second line that is floated, a third line to which the first signal is provided, and a fourth line electrically connected to the first line, the second line, or the third line based on the control signal. The fourth line of at least one of the plurality of switches is electrically connected to at least one of the plurality of antenna patterns.

Each of the plurality of switches may further include a fifth line to which a second signal having a frequency different from the predetermined frequency is provided, and the fourth line may be selectively electrically connected to the fifth line.

The display layer may further include a first auxiliary electrode disposed between neighboring antenna patterns of the plurality of antenna patterns.

The first auxiliary electrode may be floated.

The first auxiliary electrode may extend in the first direction and may be spaced apart from the plurality of antenna patterns.

The first auxiliary electrode may be electrically connected to the fourth line of another one of the plurality of switches.

The display layer may further include a second auxiliary electrode disposed in the peripheral region and disposed at one end of each of the plurality of antenna patterns.

The second auxiliary electrode may be floated.

The second auxiliary electrode may be electrically connected to the fourth line of another one of the plurality of switches.

The second auxiliary electrode may extend in a second direction that crosses the first direction and may be spaced apart from the plurality of antenna patterns.

The sensor layer may include a plurality of sensing electrodes disposed in the active region and a sub-antenna pattern that is disposed in the active region and that transmits and receives a sub-signal having a predetermined frequency.

The sub-antenna pattern may be electrically connected to the fourth line of another one of the plurality of switches.

The plurality of antenna patterns may transmit a frequency-modulated signal and may receive the frequency-modulated signal reflected from an object, and the controller may calculate a distance between the object and the electronic device, based on a time delay and/or a frequency difference between transmission and reception of the frequency-modulated signal.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
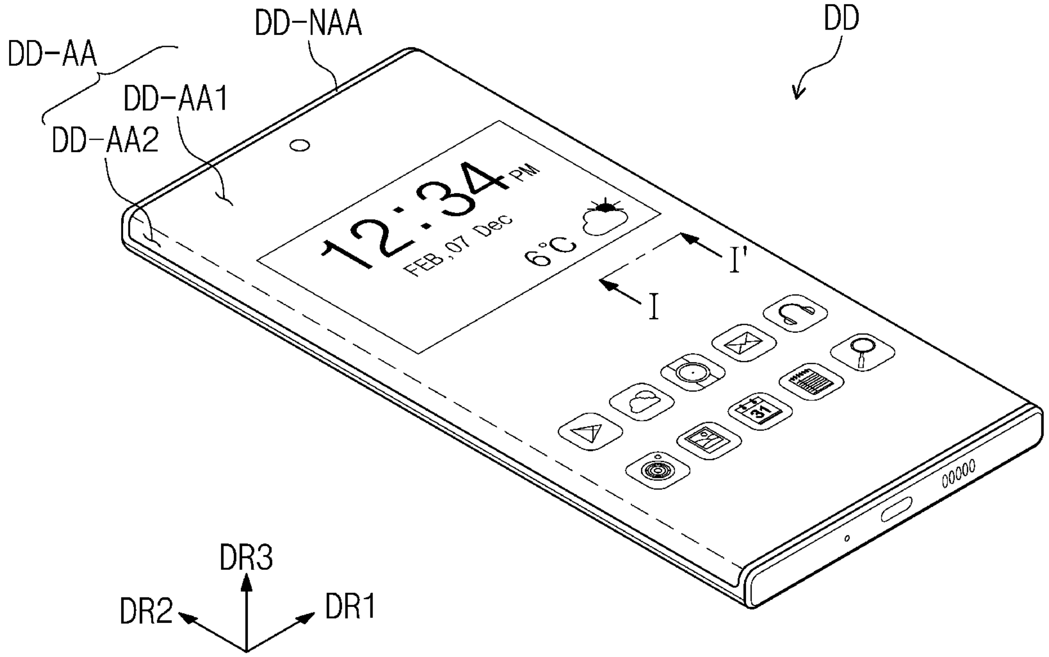
FIG. 1 is a perspective view of an electronic device, according to an embodiment of the present disclosure.

In this specification, when it is mentioned that a component (or, a region, a layer, a part, etc.) is referred to as being "on", "connected to" or "coupled to" another component, this means that the component may be directly on, connected to, or coupled to the other component or a third component may be present therebetween.

Like reference numerals may refer to like components throughout the specification and the drawings. While each drawing may represent one or more particular embodiments of the present, drawn to scale, such that the relative lengths, thicknesses, and angles can be inferred therefrom, it is to be understood that the present invention is not necessarily limited to the relative lengths, thicknesses, and angles shown. Changes to these values may be made within the spirit and scope of the present disclosure, for example, to allow for manufacturing limitations and the like. As used herein, the term "and/or" includes all of one or more combinations defined by related components.

Terms such as first, second, and the like may be used to describe various components, but the components should not necessarily be limited by the terms. The terms may be used for distinguishing one component from other components. For example, without departing the scope of the present disclosure, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

Hereinafter, embodiments of the present disclosure will be described with reference to the accompanying drawings.

FIG. 1 is a perspective view of an electronic device according to an embodiment of the present disclosure.

Referring to FIG. 1, the electronic device DD may be a device activated in response to an electrical signal. For example, the electronic device DD may be a mobile phone, a tablet computer, a car navigation unit, a game machine, or a wearable device, but is not necessarily limited thereto. FIG. 1 illustrates one example that the electronic device DD is a mobile phone.

An active region DD-AA and a peripheral region DD-NAA may be defined in the electronic device DD. An image may be displayed on the active region DD-AA. The peripheral region DD-NAA may be disposed proximate to the active region DD-AA.

A first display surface DD-AA1 parallel to a plane defined by a first direction DR1 and a second direction DR2 crossing the first direction DR1 and a second display surface DD-AA2 extending from the first display surface DD-AA1 may be defined in the active region DD-AA.

The second display surface DD-AA2 may be bent from one side of the first display surface DD-AA1. Alternatively, a plurality of second display surfaces DD-AA2 may be provided. In this case, the second display surface DD-AA2 may be bent from at least two sides of the first display surface DD-AA1. One first display surface DD-AA1 and up to four second display surfaces DD-AA2 may be defined in the active region DD-AA. However, the shape of the active region DD-AA is not necessarily limited thereto, and the first display surface DD-AA1 may be defined by itself in the active region DD-AA.

A thickness direction of the electronic device DD may be parallel to a third direction DR3 crossing the first direction DR1 and the second direction DR2. Accordingly, front surfaces (or, upper surfaces) and rear surfaces (or, lower surfaces) of members constituting the electronic device DD may be defined based on the third direction DR3.

Figure 2:
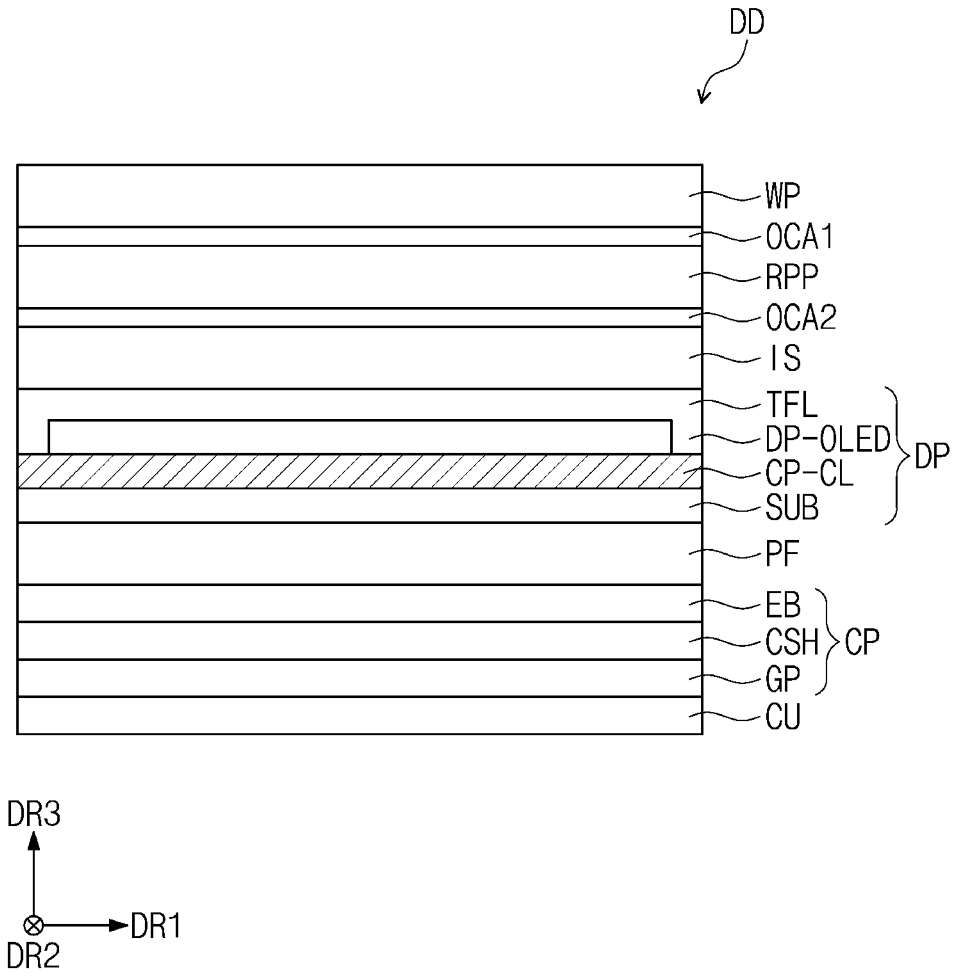
FIG. 2 is a schematic cross-sectional view of the electronic device, according to an embodiment of the present disclosure.

FIG. 2 is a schematic cross-sectional view of the electronic device, according to an embodiment of the present disclosure.

Referring to FIG. 2, the electronic device DD may include a window WP, a plurality of adhesive layers OCA1, OCA2, and OCAS, an anti-reflection layer RPP, a sensor layer IS, a display layer DP, a protective layer PF, a lower member layer CP, and a cover layer CU.

The window WP may form the exterior of the electronic device DD. The window WP may be a component that protects internal components of the electronic device DD from an external impact and substantially provides the active region DD-AA of the electronic device DD. For example, the window WP may include a glass substrate, a sapphire substrate, or a plastic film. The window WP may have a single-layer structure or a multi-layer structure. For example, the window WP may have a stacked structure of a plurality of plastic films coupled through an adhesive, or may have a stacked structure of a glass substrate and a plastic film coupled through an adhesive.

The adhesive layer OCA1 may be disposed under the window WP. The window WP and the anti-reflection layer RPP may be coupled by the adhesive layer OCA1. The adhesive layer OCA1 may include a general adhesive or sticky substance. For example, the adhesive layer OCA1 may be an optically clear adhesive film, an optically clear resin, or a pressure sensitive adhesive film.

The anti-reflection layer RPP may be disposed under the window WP. The anti-reflection layer RPP may decrease the reflectivity of natural light (or, sunlight) incident from above the window WP.

The anti-reflection layer RPP, according to an embodiment of the present disclosure, may include a phase retarder and a polarizer. The phase retarder may be of a film type or a liquid-crystal coating type and may include a $\lambda/2$ phase retarder (e.g., a half-wave plate) and/or a $\lambda/4$ phase retarder (e.g., a quarter-wave plate). The polarizer may be of a film type or a liquid-crystal coating type. The film type may include a stretchable synthetic resin film, and the liquid-crystal coating type may include liquid crystals arranged in a predetermined arrangement. The phase retarder and the polarizer may further include a protective film. The phase retarder and the polarizer themselves or the protective film may be defined as a base layer of the anti-reflection layer RPP. However, this is illustrative, and the anti-reflection layer RPP according to an embodiment of the present disclosure may be omitted.

The adhesive layer OCA2 may be disposed under the anti-reflection layer RPP. The anti-reflection layer RPP may be coupled by the adhesive layer OCA2. The adhesive layer OCA2 may include substantially the same material as the adhesive layer OCA1.

The sensor layer IS may obtain coordinate information of an external input. The sensor layer IS, according to an embodiment of the present disclosure, may be disposed directly on one surface of the display layer DP. For example, the sensor layer IS may be integrated with the display layer DP in an on-cell type. The sensor layer IS may be manufactured by a continuous process with the display layer DP. However, without necessarily being limited thereto, the sensor layer IS may be manufactured by a separate process and may be bonded to the display layer DP. The sensor layer IS may include a touch panel.

The display layer DP may be disposed under the sensor layer IS. The display layer DP may be a component that substantially generates an image. The display layer DP may be an emissive display layer, but is not necessarily particularly limited thereto. For example, the display layer DP may include an organic light emitting display layer, a quantum-dot display layer, a micro-LED display layer, or a nano-LED display layer. The display layer DP may include a base layer SUB, a circuit layer DP-CL, a light emitting element layer DP-OLED, and an encapsulation layer TFL. Description thereabout will be given below.

The display layer DP may transmit, receive, or transmit/receive a wireless communication signal, for example, a radio frequency signal. The display layer DP may include an antenna pattern. The antenna pattern may transmit, receive, or transmit/receive a frequency band, or may transmit, receive, or transmit/receive different frequency bands. The antenna pattern will be described in detail below.

The protective layer PF may be disposed under the display layer DP. The protective layer PF may protect a lower surface of the display layer DP. The protective layer PF may include polyethylene terephthalate (PET). However, the material of the protective layer PF is not necessarily particularly limited thereto.

The lower member layer CP may include an embo layer EB, a cushion layer CSH, and/or a heat radiating sheet GS.

The embo layer EB may be disposed under the protective layer PF. The embo layer EB may be a colored layer. For example, the embo layer EB may be black. The embo layer EB may absorb light incident on the embo layer EB. The embo layer EB may be a layer having adhesive properties on both surfaces thereof. The embo layer EB may include a general adhesive or sticky substance. The protective layer PF and the cushion layer CSH may be coupled by the embo layer EB.

The cushion layer CSH may be disposed under the embo layer EB. The cushion layer CSH may have a function of relieving pressure applied externally. The cushion layer CSH may include a sponge, expanded foam, or a urethane resin. The cushion layer CSH may be thicker than the embo layer EB.

The heat radiating sheet GS may be disposed under the cushion layer CSH. The heat radiating sheet GS may induce radiation of heat generated from the display layer DP. For example, the heat radiating sheet GS may be a graphite sheet. In an embodiment of the present disclosure, a film layer may be additionally disposed between the cushion layer CSH and the heat radiating sheet GS. The film layer may include polyimide (PI).

The cover layer CU may be disposed under the lower member layer CP. The cover layer CU may have conductivity. For example, the cover layer CU may include copper (Cu). For example, the cover layer CU may be a copper (Cu) tape. However, the present disclosure is not necessarily particularly limited thereto. A ground voltage may be applied to the cover layer CU. However, this is illustrative, and the cover layer CU may be floated.

Figure 3A:
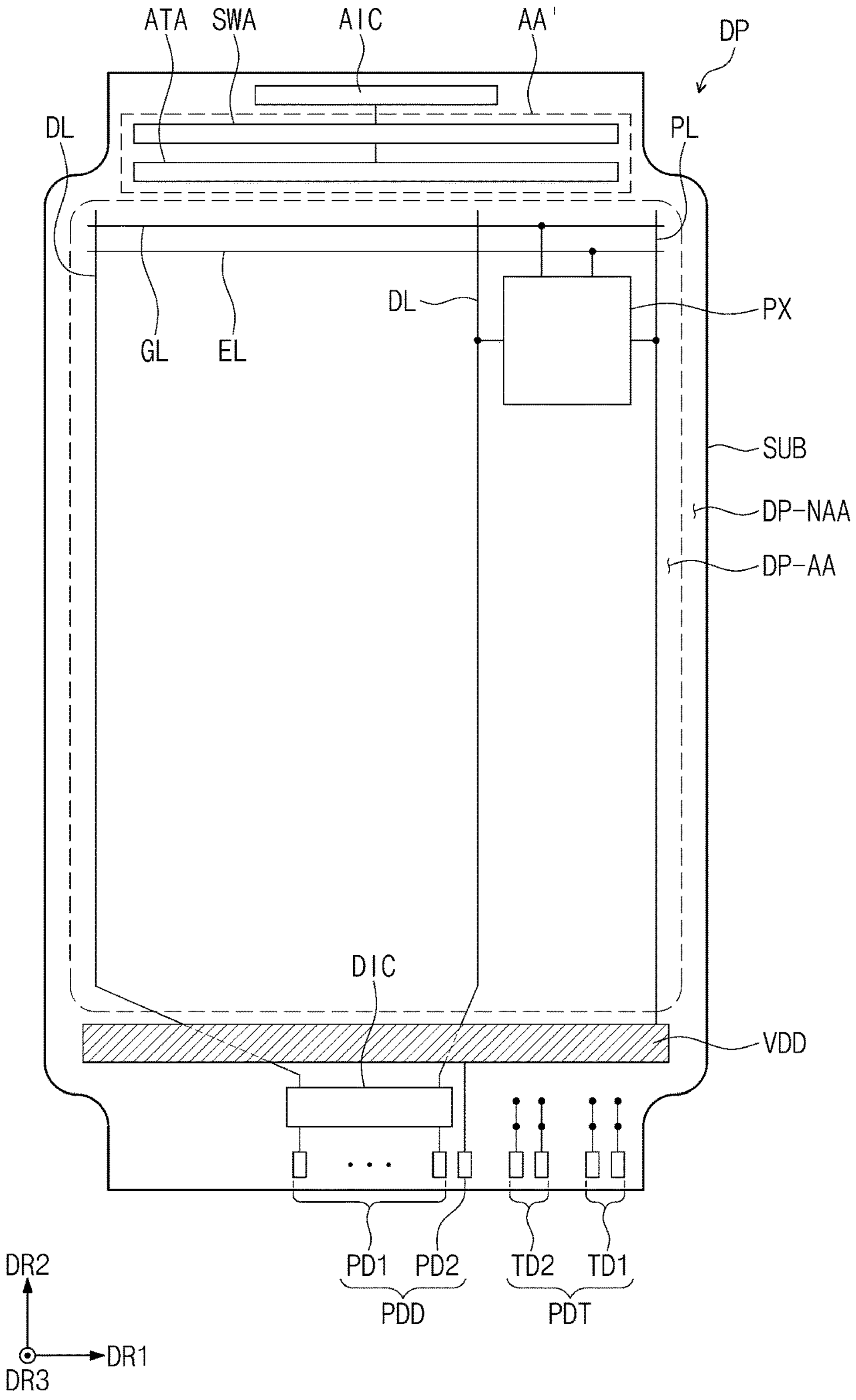
FIG. 3A is a plan view of a display layer, according to an embodiment of the present disclosure.

FIG. 3A is a plan view of the display layer, according to an embodiment of the present disclosure.

Referring to FIG. 3A, an active region DP-AA and a peripheral region DP-NAA proximate to the active region DP-AA may be defined in the display layer DP. The active region DP-AA may be a region on which an image is displayed. A plurality of pixels PX may be disposed in the active region DP-AA. The peripheral region DP-NAA may be a region in which a drive circuit or a drive line is disposed. When viewed on the plane, the active region DP-AA may at least partially overlap the active region DD-AA (refer to FIG. 1) of the electronic device DD (refer to FIG. 1), and the peripheral region DP-NAA may at least partially overlap the peripheral region DD-NAA (refer to FIG. 1) of the electronic device DD (refer to FIG. 1).

The display layer DP may include the base layer SUB, the plurality of pixels PX, a plurality of signal lines GL, DL, PL, and EL, a plurality of display pads PDD, and a plurality of sensing pads PDT.

Each of the plurality of pixels PX may display one primary color or one of mixed colors. The primary colors may include red, green, and blue. The mixed colors may include various colors such as white, yellow, cyan, and magenta. However, colors displayed by the pixels PX, respectively, are not necessarily limited thereto.

The plurality of signal lines GL, DL, PL, and EL may be disposed on the base layer SUB. The plurality of signal lines GL, DL, PL, and EL may be connected to the plurality of pixels PX and may transfer electrical signals to the plurality of pixels PX. The plurality of signal lines GL, DL, PL, and EL may include a plurality of scan lines GL, a plurality of data lines DL, a plurality of power lines PL, and a plurality of emission control lines EL. However, this is illustrative, and a configuration of the plurality of signal lines GL, DL, PL, and EL according to an embodiment of the present disclosure is not necessarily limited thereto. For example, the plurality of signal lines GL, DL, PL, and EL according to an embodiment of the present disclosure may further include an initialization voltage line.

A power pattern VDD may be disposed in the peripheral region DP-NAA. The power pattern VDD may be connected to the plurality of power lines PL. The display layer DP including the power pattern VDD may provide the same power signal to the plurality of pixels PX.

The plurality of display pads PDD may be disposed in the peripheral region DP-NAA. The plurality of display pads PDD may include a first pad PD1 and a second pad PD2. A plurality of first pads PD1 may be provided. The plurality of first pads PD1 may be connected to the plurality of data lines DL, respectively. The second pad PD2 may be connected to the power pattern VDD and may be electrically connected to the plurality power lines PL. The display layer DP may provide, to the plurality of pixels PX, electrical signals provided externally through the plurality of display pads PDD. The plurality of display pads PDD may further include pads for receiving other electrical signals, in addition to the first pads PD1 and the second pad PD2 and are not necessarily limited to any one embodiment.

A drive circuit DIC may be mounted on the peripheral region DP-NAA. The drive circuit DIC may be a timing control circuit in the form of a chip. The plurality of data lines DL may be electrically connected to the plurality of first pads PD1 through the drive circuit DIC. However, this is illustrative, and the drive circuit DIC, according to an embodiment of the present disclosure, may be mounted on a film separate from the display layer DP. In this case, the drive circuit DIC may be electrically connected to the plurality of display pads PDD through the film.

The plurality of sensing pads PDT may be disposed in the peripheral region DP-NAA. The plurality of sensing pads PDT may be electrically connected to a plurality of sensing electrodes of the sensor layer IS (refer to FIG. 3) to be described below. The plurality of sensing pads PDT may include a plurality of first sensing pads TD1 and a plurality of second sensing pads TD2.

The display layer DP may further include an antenna array ATA including a plurality of antenna patterns ATP (refer to FIG. 7), a switch array SWA including a plurality of switches SW (refer to FIG. 7), and a controller AIC.

The antenna array ATA, the switch array SWA, and the controller AIC may be disposed in the peripheral region DP-NAA.

The antenna array ATA may transmit and receive external signals. The antenna array ATA may be electrically connected to the switch array SWA.

The switch array SWA may switch signals that are provided to the antenna array ATA. The switch array SWA may be electrically connected to the controller AIC. The switch array SWA may select a signal provided to the antenna array ATA, based on a control signal provided from the controller AIC.

Although FIG. 3A illustrates the antenna array ATA, the switch array SWA, and the controller AIC that are disposed in the peripheral region DP-NAA proximate to the active region DP-AA in the second direction DR2, an arrangement relationship between the antenna array ATA, the switch array SWA, and the controller AIC according to an embodiment of the present disclosure is not necessarily limited thereto. For example, the antenna array ATA, the switch array SWA, and the controller AIC may be disposed in the peripheral region DP-NAA that is proximate to the active region DP-AA in the first direction DR1.

Figure 3B:
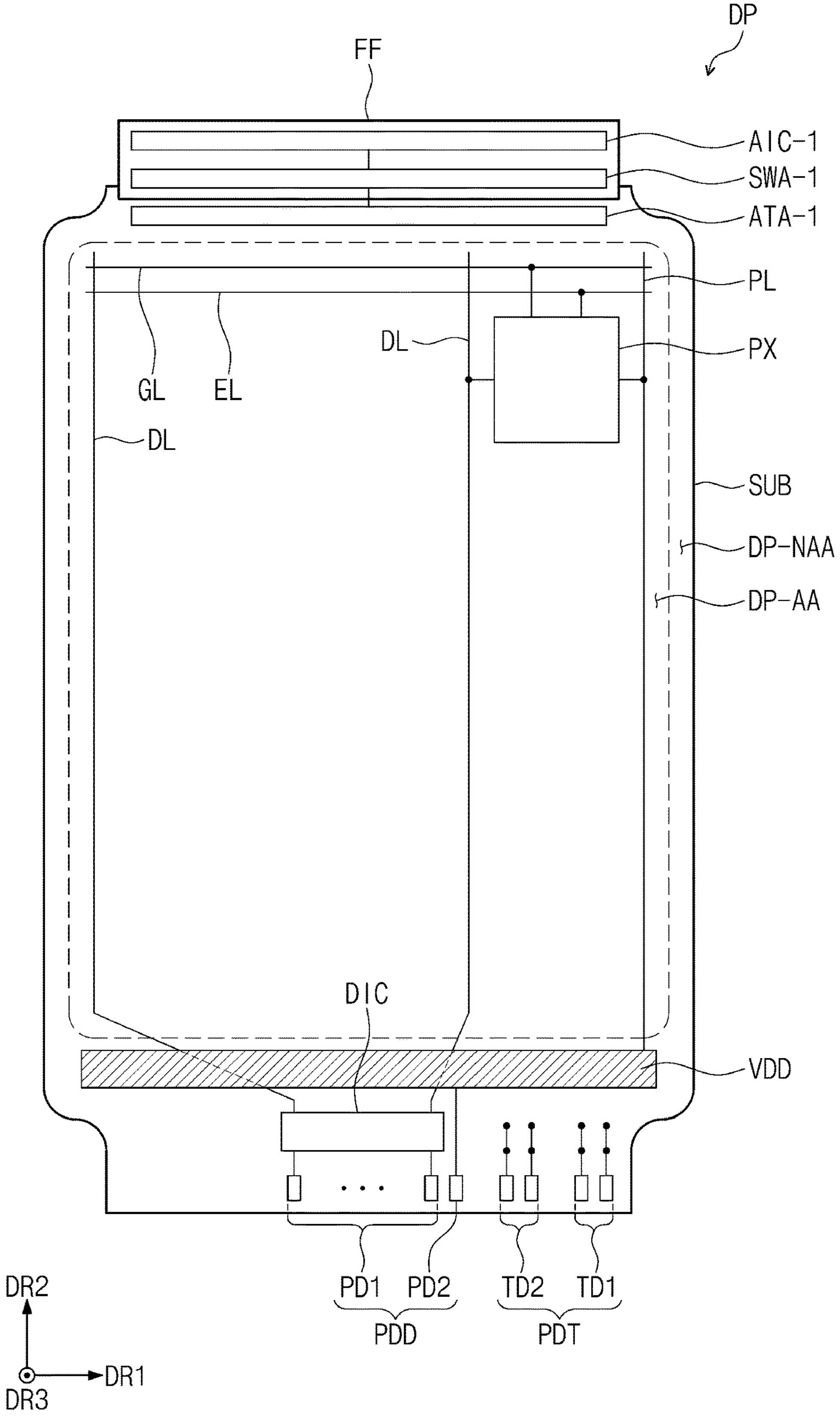
FIG. 3B is a plan view of the display layer and a flexible circuit board, according to an embodiment of the present disclosure.

FIG. 3B is a plan view of the display layer and a flexible circuit board, according to an embodiment of the present disclosure. In describing FIG. 3B, the components described with reference to FIG. 3A will be assigned with the same reference numerals, and to the extent that a description of these elements is omitted, it may be understood that these elements are at least similar to corresponding elements that are described elsewhere within the specification.

Referring to FIG. 3B, the electronic device DD (refer to FIG. 1) may further include the flexible circuit board FF. The flexible circuit board FF may be electrically connected to the display layer DP.

Figure 7:
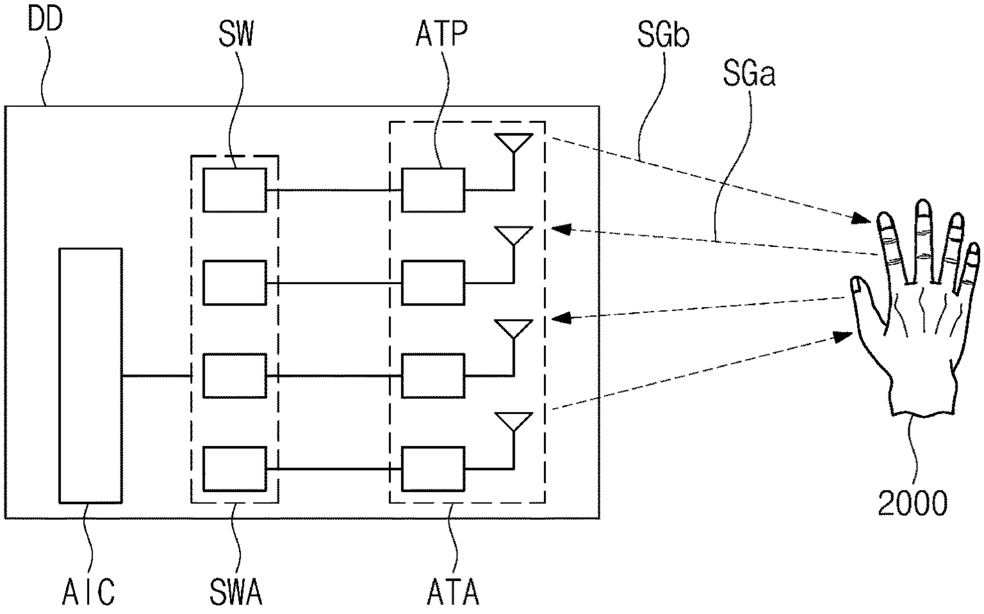
FIG. 7 is a schematic view illustrating a gesture sensing system, according to an embodiment of the present disclosure.

The display layer DP may further include an antenna array ATA-1 including the plurality of antenna patterns ATP (refer to FIG. 7).

The antenna array ATA-1 may be disposed in the peripheral region DP-NAA. The antenna array ATA-1 may transmit and receive external signals.

The flexible circuit board FF may include a switch array SWA-1 including the plurality of switches SW (refer to FIG. 7) and a controller AIC-1.

The switch array SWA-1 may be electrically connected to the antenna array ATA-1. The switch array SWA-1 may switch signals that are provided to the antenna array ATA-1. The switch array SWA-1 may be electrically connected to the controller AIC-1. The switch array SWA-1 may select a signal provided to the antenna array ATA-1, based on a control signal provided from the controller AIC-1.

The flexible circuit board FF may be bent and may be disposed on the lower surface of the display layer DP.

Figure 4:
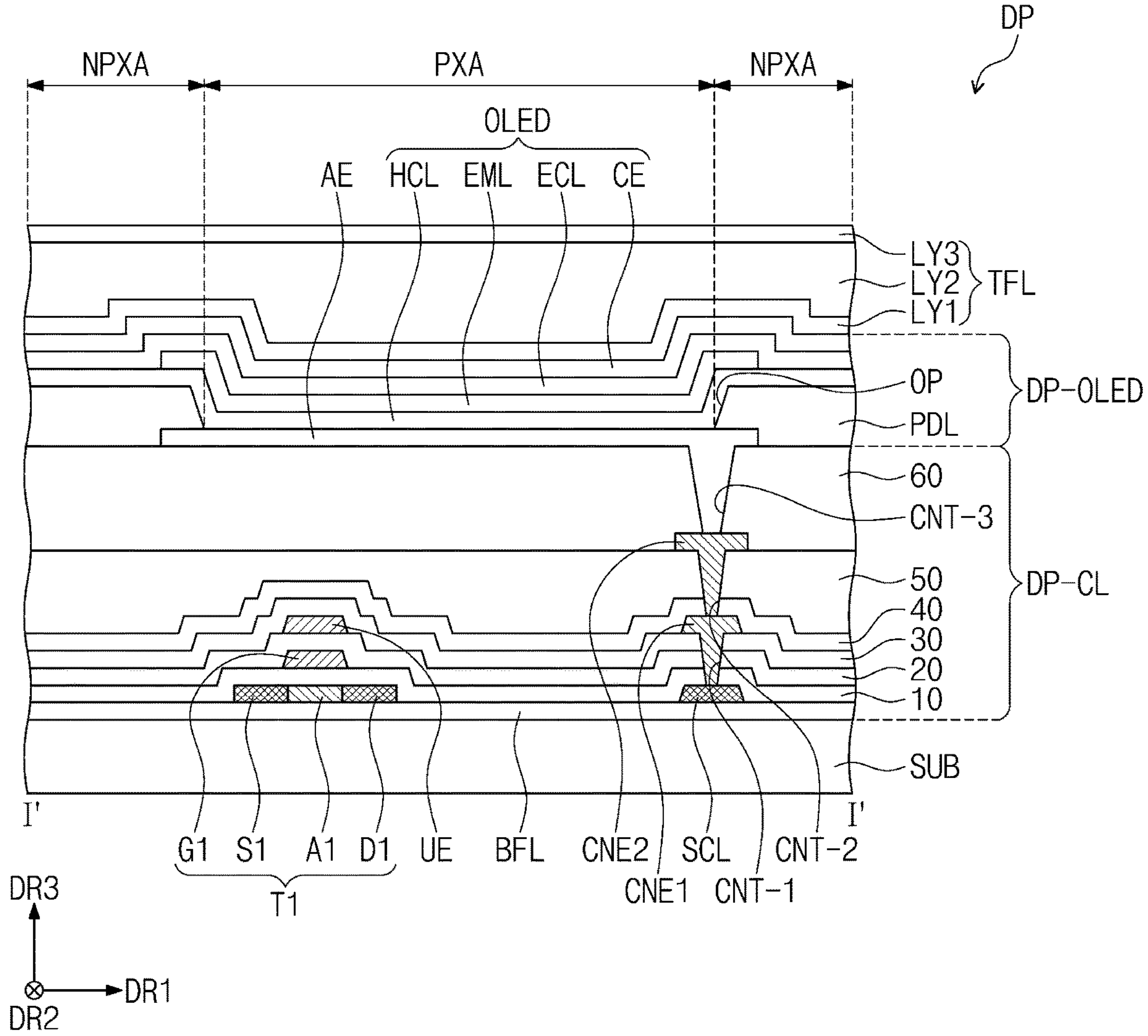
FIG. 4 is a cross-sectional view of the display layer taken along line I-I' of FIG. 1, according to an embodiment of the present disclosure.

FIG. 4 is a cross-sectional view of the display layer taken along line I-I' of FIG. 1 according to an embodiment of the present disclosure.

Referring to FIG. 4, the display layer DP may include the base layer SUB, the circuit layer DP-CL, the light emitting element layer DP-OLED, and the encapsulation layer TFL. The display layer DP may include a plurality of insulating layers, a semiconductor pattern, a conductive pattern, and a signal line. The insulating layers, a semiconductor layer, and a conductive layer may be formed by coating, deposition, or the like. Thereafter, the insulating layers, the semiconductor layer, and the conductive layer may be selectively subjected to patterning by photolithography. The semiconductor pattern, the conductive pattern, and the signal line included in the circuit layer DP-CL and the light emitting element layer DP-OLED may be formed by the above-described method. The base layer SUB may be a base substrate that supports the circuit layer DP-CL and the light emitting element layer DP-OLED.

The base layer SUB may include a synthetic resin layer. The synthetic resin layer may include a thermosetting resin. The base layer SUB may have a multi-layer structure. For example, the base layer SUB may include a first synthetic resin layer, a silicon oxide ($SiO_x$) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a base barrier layer.

The circuit layer DP-CL may be disposed on the base layer SUB. The circuit layer DP-CL may provide a signal for driving a light emitting element OLED included in the light emitting element layer DP-OLED. The circuit layer DP-CL may include a buffer layer BFL, a transistor T1, a first insulating layer 10, a second insulating layer 20, a third insulating layer 30, a fourth insulating layer 40, a fifth insulating layer 50, and a sixth insulating layer 60.

The buffer layer BFL may increase a coupling force between the base layer SUB and the semiconductor pattern. The buffer layer BFL may include silicon oxide layers and silicon nitride layers. The silicon oxide layers and the silicon nitride layers may be alternately stacked one above another.

The semiconductor pattern may be disposed on the buffer layer BFL. The semiconductor pattern may include polysilicon. However, without necessarily being limited thereto, the semiconductor pattern may include amorphous silicon or metal oxide.

FIG. 4 illustrates a portion of the semiconductor pattern, and the semiconductor pattern may be additionally disposed in another region of the pixel PX on the plane. The semiconductor pattern may be arranged across the plurality of pixels PX according to a specific rule. The semiconductor pattern may have different electrical properties depending on whether the semiconductor pattern is doped or not. The semiconductor pattern may include a first region having a high conductivity and a second region having a low conductivity. The first region may be doped with an N-type dopant or a P-type dopant. A P-type transistor may include a doped region that is doped with a P-type dopant, and an N-type transistor may include a doped region that is doped with an N-type dopant. The second region may be an undoped region, or may be a region more lightly doped than the first region.

The first region may have a higher conductivity than the second region and may substantially serve as an electrode or a signal line. The second region may substantially correspond to an active (or, channel) region of a transistor. In other words, one portion of the semiconductor pattern may be the active region of the transistor, another portion may be a source or drain of the transistor, and another portion may be a connecting electrode or a connecting signal line.

Each of the plurality of pixels PX (refer to FIG. 3) may have an equivalent circuit including seven transistors, one capacitor, and a light emitting element, and the equivalent circuit of the pixel may be modified in various forms. In FIG. 4, the transistor T1 and the light emitting element OLED that are included in each of the plurality of pixels PX (refer to FIG. 4A) are illustrated. The transistor T1 may include a source SS1, an active region A1, a drain DN1, and a gate GT1.

The source SS1, the active region A1, and the drain DN1 of the transistor T1 may be formed from the semiconductor pattern. The source SS1 and the drain DN1 may extend from the active region A1 in opposite directions on the section. In FIG. 4, a portion of a connecting signal line SCL formed from the semiconductor pattern is illustrated.

The first insulating layer 10 may be disposed on the buffer layer BFL. The first insulating layer 10 may commonly overlap the plurality of pixels PX and may at least partially cover the semiconductor pattern. The first insulating layer 10 may be an inorganic layer and/or an organic layer and may have a single-layer structure or a multi-layer structure. The first insulating layer 10 may include aluminum oxide, titanium oxide, silicon oxide, silicon oxy-nitride, zirconium oxide, and/or hafnium oxide. In this embodiment, the first insulating layer 10 may be a single silicon oxide layer. Not only the first insulating layer 10 but also insulating layers of the circuit layer DP-CL, which will be described below, may be inorganic layers and/or organic layers and may have a single-layer structure or a multi-layer structure. The inorganic layers may include at least one of the aforementioned materials.

The gate GT1 may be disposed on the first insulating layer 10. The gate GT1 may be a portion of a metal pattern. The gate GT1 may at least partially overlap the active region A1. The gate GT1 may function as a mask in a process of doping the semiconductor pattern.

The second insulating layer 20 may be disposed on the first insulating layer 10. The second insulating layer 20 may at least partially cover the gate GT1. The second insulating layer 20 may commonly overlap the plurality of pixels PX. The second insulating layer 20 may be an inorganic layer and/or an organic layer and may have a single-layer structure or a multi-layer structure. In this embodiment, the second insulating layer 20 may be a single silicon oxide layer.

An upper electrode UE may be disposed on the second insulating layer 20. The upper electrode UE may at least partially overlap the gate GT1. The upper electrode UE may be a portion of a metal pattern. A portion of the gate GT1 and the upper electrode UE overlapping the gate GT1 may define a capacitor. However, this is illustrative, and the upper electrode UE according to an embodiment of the present disclosure may be omitted.

The third insulating layer 30 may be disposed on the second insulating layer 20. The third insulating layer 30 may at least partially cover the upper electrode UE. In this embodiment, the third insulating layer 30 may be a single silicon oxide layer. A first connecting electrode CNE1 may be disposed on the third insulating layer 30. The first connecting electrode CNE1 may be connected to the connecting signal line SCL through a contact hole CNT-1 penetrating the first, second, and third insulating layers 10, 20, and 30.

The fourth insulating layer 40 may be disposed on the third insulating layer 30. The fourth insulating layer 40 may at least partially cover the first connecting electrode CNE1. The fourth insulating layer 40 may be a single silicon oxide layer.

The fifth insulating layer 50 may be disposed on the fourth insulating layer 40. The fifth insulating layer 50 may be an organic layer. A second connecting electrode CNE2 may be disposed on the fifth insulating layer 50. The second connecting electrode CNE2 may be connected to the first connecting electrode CNE1 through a contact hole CNT-2 penetrating the fourth insulating layer 40 and the fifth insulating layer 50.

The sixth insulating layer 60 may be disposed on the fifth insulating layer 50. The sixth insulating layer 60 may at least partially cover the second connecting electrode CNE2. The sixth insulating layer 60 may be an organic layer.

The light emitting element layer DP-OLED may include a first electrode AE, a pixel defining layer PDL, and the light emitting element OLED. The light emitting element OLED may be electrically connected to the transistor T1. The light emitting element OLED may include a hole control layer HCL, an emissive layer EML, an electron control layer ECL, and a second electrode CE.

The first electrode AE may be disposed on the sixth insulating layer 60. The first electrode AE may be connected to the second connecting electrode CNE2 through a contact hole CNT-3 penetrating the sixth insulating layer 60.

The pixel defining layer PDL may have an opening OP defined therein. The opening OP of the pixel defining layer PDL may expose at least a portion of the first electrodes AE.

The active region DP-AA (refer to FIG. 3) may include an emissive region PXA and a light blocking region NPXA proximate to the emissive region PXA. The light blocking region NPXA may at least partially surround the emissive region PXA. In this embodiment, the emissive region PXA is defined to correspond to a partial region of the first electrode AE exposed through the opening OP.

The hole control layer HCL may be commonly disposed in the emissive region PXA and the light blocking region NPXA. The hole control layer HCL may include a hole transport layer and may further include a hole injection layer. The emissive layer EML may be disposed on the hole control layer HCL. The emissive layer EML may be disposed in a region corresponding to the opening OP. That is, the emissive layer EML may be separately formed for each of the pixels.

The electron control layer ECL may be disposed on the emissive layer EML. The electron control layer ECL may include an electron transport layer and may further include an electron injection layer. The hole control layer HCL and the electron control layer ECL may be commonly formed for the plurality of pixels by using an open mask. The second electrode CE may be disposed on the electron control layer ECL. The second electrode CE may have an integral shape. The second electrode CE may be commonly disposed for the plurality of pixels PX. The second electrode CE may be referred to as a common electrode CE.

The encapsulation layer TFL may be disposed on the light emitting element layer DP-OLED and may at least partially cover the light emitting element layer DP-OLED. The encapsulation layer TFL may include a first inorganic layer LY1, an organic layer LY2, and a second inorganic layer LY3 that are sequentially stacked in the third direction DR3. However, this is illustrative, and the encapsulation layer TFL, according to an embodiment of the present disclosure, is not necessarily limited thereto. For example, the encapsulation layer TFL according to an embodiment of the present disclosure may further include a plurality of inorganic layers and a plurality of organic layers.

The first inorganic layer LY1 may prevent infiltration of external moisture or oxygen into the light emitting element layer DP-OLED. For example, the first inorganic layer LY1 may include silicon nitride, silicon oxide, or a compound obtained by a combination thereof.

The organic layer LY2 may be disposed on the first inorganic layer LY1 and may provide a flat surface. Raised and recessed portions formed on an upper surface of the first inorganic layer LY1 or particles existing on the first inorganic layer LY1 may be at least partially covered by the organic layer LY2. For example, the organic layer LY2 may include an acrylate-based organic layer, but is not necessarily limited thereto.

The second inorganic layer LY3 may be disposed on the organic layer LY2 and may at least partially cover the organic layer LY2. The second inorganic layer LY3 may seal moisture discharged from the organic layer LY2 and may prevent the moisture from escaping. The second inorganic layer LY3 may include silicon nitride, silicon oxide, or a compound obtained by a combination thereof.

Figure 5:
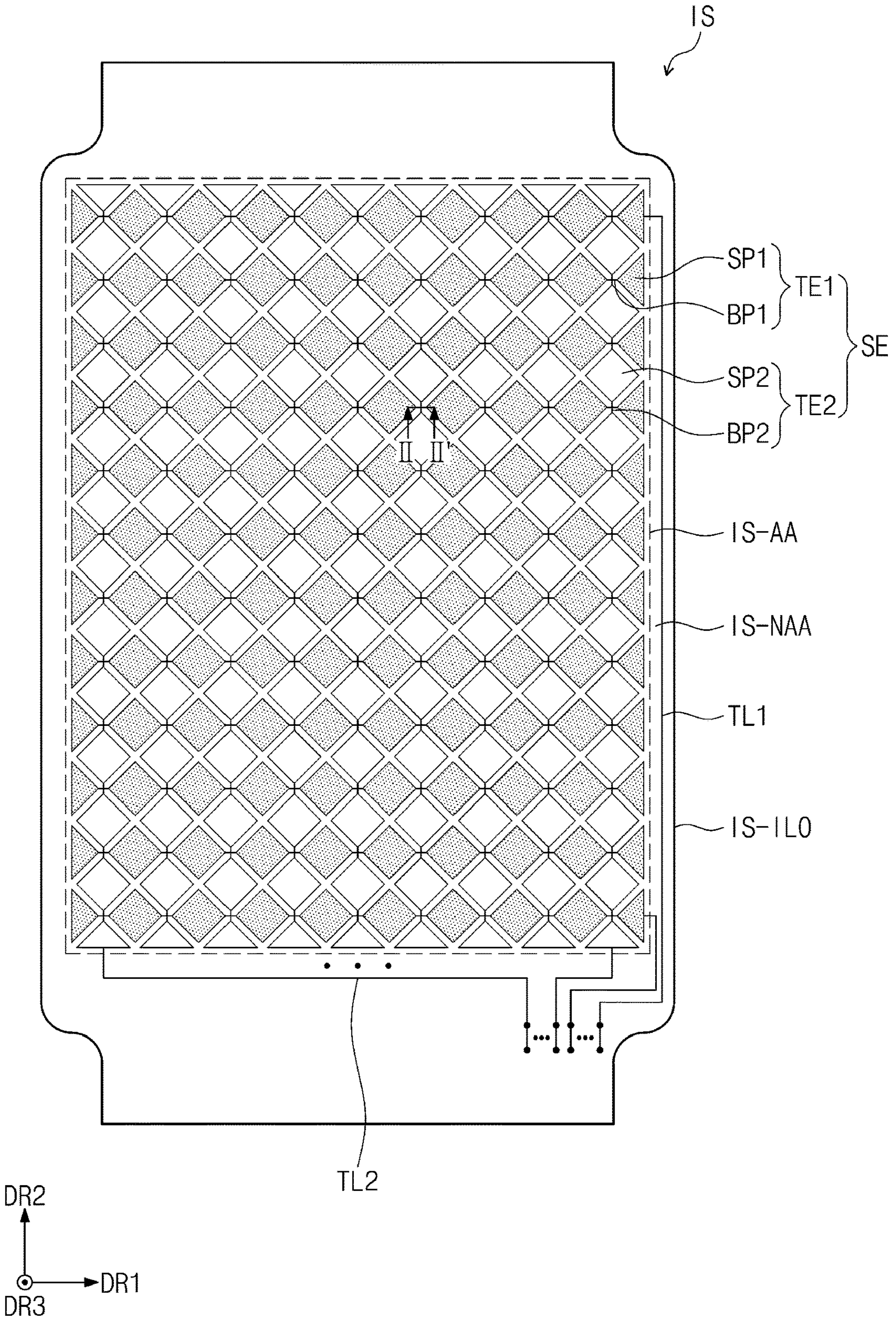
FIG. 5 is a plan view of a sensor layer, according to an embodiment of the present disclosure.

FIG. 5 is a plan view of the sensor layer according to an embodiment of the present disclosure.

Referring to FIG. 5, an active region IS-AA and a peripheral region IS-NAA at least partially surrounding the active region IS-AA may be defined in the sensor layer IS. The active region IS-AA may be a region activated in response to an electrical signal. For example, the active region IS-AA may be a region that senses an input. When viewed on the plane, the active region IS-AA may at least partially overlap the active region DP-AA (refer to FIG. 3) of the display layer DP (refer to FIG. 3), and the peripheral region IS-NAA may at least partially overlap the peripheral region DP-NAA (refer to FIG. 3) of the display layer DP (refer to FIG. 3).

The sensor layer IS may include a base insulating layer IS-IL0, a plurality of sensing electrodes SE, and a plurality of sensing lines TL1 and TL2. The plurality of sensing electrodes SE may be disposed in the active region IS-AA, and the plurality of sensing lines TL1 and TL2 may be disposed in the peripheral region IS-NAA.

The base insulating layer IS-IL0 may be an inorganic layer that includes silicon nitride, silicon oxy-nitride, and/or silicon oxide. Alternatively, the base insulating layer IS-IL0 may be an organic layer that includes an epoxy resin, an acrylic resin, or an imide-based resin. The base insulating layer IS-IL0 may be directly formed on the display layer DP (refer to FIG. 3). Alternatively, the base insulating layer IS-IL0 may be coupled with the display layer DP (refer to FIG. 3) through an adhesive member.

The plurality of sensing electrodes SE may include a plurality of first sensing electrodes TE1 and a plurality of second sensing electrodes TE2. The sensor layer IS may obtain information about an external input through a change in mutual capacitance between neighboring sensing electrodes of the plurality of first sensing electrodes TE1 and the plurality of second sensing electrodes TE2.

The plurality of first sensing electrodes TE1 may extend in the first direction DR1 and may be arranged in the second direction DR2. Each of the plurality of first sensing electrodes TE1 may include a plurality of sensing patterns SP1 and a plurality of bridge patterns BP1. Each of the plurality of bridge patterns BP1 may electrically connect two sensing patterns SP1 proximate to each other. The plurality of sensing patterns SP1 may have a mesh structure. The plurality of second sensing electrodes TE2 may extend in the second direction DR2 and may be arranged in the first direction DR1. Each of the plurality of second sensing electrodes TE2 may include a plurality of first portions SP2 and a plurality of second portions BP2. Each of the plurality of second portions BP2 may electrically connect two first portions SP2 proximate to each other. The plurality of first portions SP2 and the plurality of second portions BP2 may have a mesh structure.

Although FIG. 5 illustrates one example that one bridge pattern BP1 is connected to two sensing patterns SP1 proximate to each other, a connection relationship between neighboring bridge patterns of the plurality of bridge patterns BP1 and the plurality of sensing patterns SP1, according to an embodiment of the present disclosure, is not necessarily limited thereto. For example, two sensing patterns SP1 proximate to each other may be connected by two bridge patterns BP1.

The plurality of bridge patterns BP1 may be disposed in a different layer from the plurality of second portions BP2. The plurality of bridge patterns BP1 may insulatively intersect the plurality of second sensing electrodes TE2. For example, the plurality of bridge patterns BP1 may insulatively intersect the plurality of second portions BP2.

The plurality of sensing lines TL1 and TL2 may include a plurality of first sensing lines TL1 and a plurality of second sensing lines TL2. The plurality of first sensing lines TL1 may be electrically connected to the plurality of first sensing electrodes TE1, respectively. The plurality of second sensing lines TL2 may be electrically connected to the plurality of second sensing electrodes TE2, respectively.

The plurality of first sensing pads TD1 (refer to FIG. 3) may be electrically connected to the plurality of first sensing lines TL1 through contact holes, respectively. The plurality of second sensing pads TD2 (refer to FIG. 3) may be electrically connected to the plurality of second sensing lines TL2 through contact holes, respectively.

Figure 6:
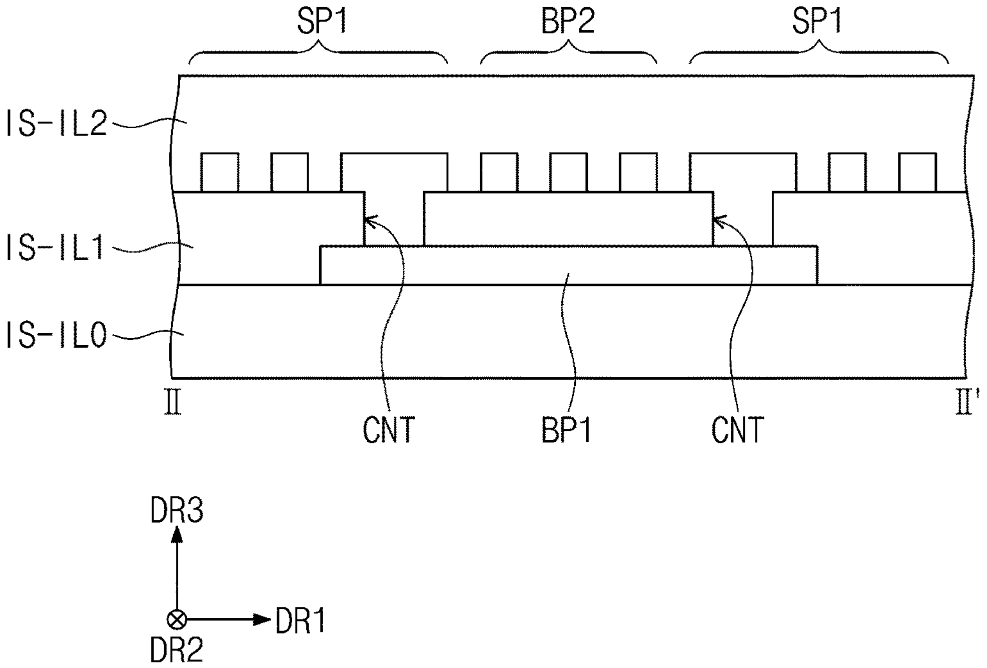
FIG. 6 is a cross-sectional view taken along line II-II' of FIG. 5, according to an embodiment of the present disclosure.

FIG. 6 is a cross-sectional view taken along line II-II' of FIG. 5 according to an embodiment of the present disclosure. In describing FIG. 6, the components described with reference to FIG. 5 will be assigned with the same reference numerals, and to the extent that a description of these elements is omitted, it may be understood that these elements are at least similar to corresponding elements that are described elsewhere within the specification.

Referring to FIGS. 5 and 6, the plurality of bridge patterns BP1 may be disposed on the base insulating layer IS-IL0. A first insulating layer IS-IL1 may be disposed on the plurality of bridge patterns BP1. The first insulating layer IS-IL1 may have a single-layer structure or a multi-layer structure. The first insulating layer IS-IL1 may include an inorganic material, an organic material, or a composite material.

The plurality of sensing patterns SP1, the plurality of first portions SP2, and the plurality of second portions BP2 may be disposed on the first insulating layer IS-ILL The plurality of sensing patterns SP1, the plurality of first portions SP2, and the plurality of second portions BP2 may have a mesh structure.

A plurality of contact holes CNT may be formed through the first insulating layer IS-IL1 in the third direction DR3. Two sensing patterns SP1 proximate to each other among the plurality of sensing patterns SP1 may be electrically connected to the bridge pattern BP1 through the plurality of contact holes CNT.

A second insulating layer IS-IL2 may be disposed on the plurality of sensing patterns SP1, the plurality of first portions SP2, and the plurality of second portions BP2. The second insulating layer IS-IL2 may have a single-layer structure or a multi-layer structure. The second insulating layer IS-IL2 may include an inorganic material, an organic material, or a composite material.

Although FIG. 6 illustrates a bottom bridge structure in which the plurality of bridge patterns BP1 are disposed under the plurality of sensing patterns SP1, the plurality of first portions SP2, and the plurality of second portions BP2, the present disclosure is not necessarily limited thereto. For example, the sensor layer IS may have a top bridge structure in which the plurality of bridge patterns BP1 are disposed over the plurality of sensing patterns SP1, the plurality of first portions SP2, and the plurality of second portions BP2.

FIG. 7 is a schematic view illustrating a gesture sensing system according to an embodiment of the present disclosure.

Referring to FIG. 7, the electronic device DD may sense a gesture of an object 2000 spaced apart from the electronic device DD. In FIG. 7, it is exemplified that the object 2000 is a user's hand.

The antenna array ATA may include the plurality of antenna patterns ATP, each of which transmits and receives a signal having a predetermined frequency.

The switch array SWA may include the plurality of switches SW. The plurality of switches SW may be connected to at least one of the plurality of antenna patterns ATP. Although FIG. 7 illustrates one example that the plurality of switches SW are connected to the plurality of antenna patterns ATP, respectively, a connection relationship between the plurality of switches SW and the plurality of patterns ATP, according to an embodiment of the present disclosure, is not necessarily limited thereto. For example, the plurality of switches SW may be connected to only some of the plurality of antenna patterns ATP.

At least one of some of the plurality of antenna patterns ATP may transmit a first signal SGa having a predetermined frequency. The predetermined frequency may be tens of gigahertz (GHz). For example, the predetermined frequency may range from 10 GHz to 90 GHz. In this case, the at least one of the some of the plurality of antenna patterns ATP may be referred to as a TX sensor.

At least one of the other antenna patterns ATP may receive a second signal SGb reflected from the object 2000. In this case, the at least one of the other antenna patterns ATP may be referred to as an RX sensor.

The controller AIC may determine the distance between the electronic device DD and the object 2000, the velocity of the object 2000, and/or the phase of the object 2000, based on a time delay and/or a frequency difference between the first signal SGa and the second signal SGb.

The controller AIC may sense a gesture of the object 2000. The controller AIC may control the display layer DP, based on the gesture. For example, a double-tap gesture may be construed as a press of a button, or a gesture of rotating a thumb and the remaining fingers may be construed as turning a dial.

According to the present disclosure, the plurality of switches SW may control the number of TX sensors and the number of RX sensors by switching signals that are provided to the plurality of antenna patterns ATP, respectively. A plurality of antenna patterns ATP that transmit and receive signals for optimal gesture sensing according to the object 2000 may be combined by the plurality of switches SW. For example, the gesture may be sensed by using one TX sensor and one RX sensor. Alternatively, the gesture may be sensed by using one TX sensor and two RX sensors. In another case, the gesture may be sensed by using two TX sensors and two RX sensors. Accordingly, the electronic device DD having increased gesture sensing reliability may be provided.

The antenna array ATA including the plurality of antenna patterns ATP may implement the first signal SGa having directivity by using a phased array technique.

Unlike in the present disclosure, an electronic device may sense a gesture using a sensor, such as a camera, a pressure sensor, or an optical sensor. In this case, there is a problem that an opaque component must not be disposed between the object 2000 and the sensor such that light is able to be transmitted, or the gesture has to be sensed while the sensor is in contact with the object 2000. However, according to the present disclosure, a gesture may be sensed by using the plurality of antenna patterns ATP that transmit and receive a radio frequency (RF) signal having a predetermined frequency. The plurality of antenna patterns ATP may be disposed in the peripheral region DP-NAA and may sense a gesture irrespective of a component disposed between the plurality of antenna patterns ATP and the object 2000. Furthermore, the plurality of antenna patterns ATP may sense a gesture of the object 2000 spaced apart from the electronic device DD by using a radio frequency (RF) signal. Accordingly, the electronic device DD having increased reliability may be provided.

Figure 8:
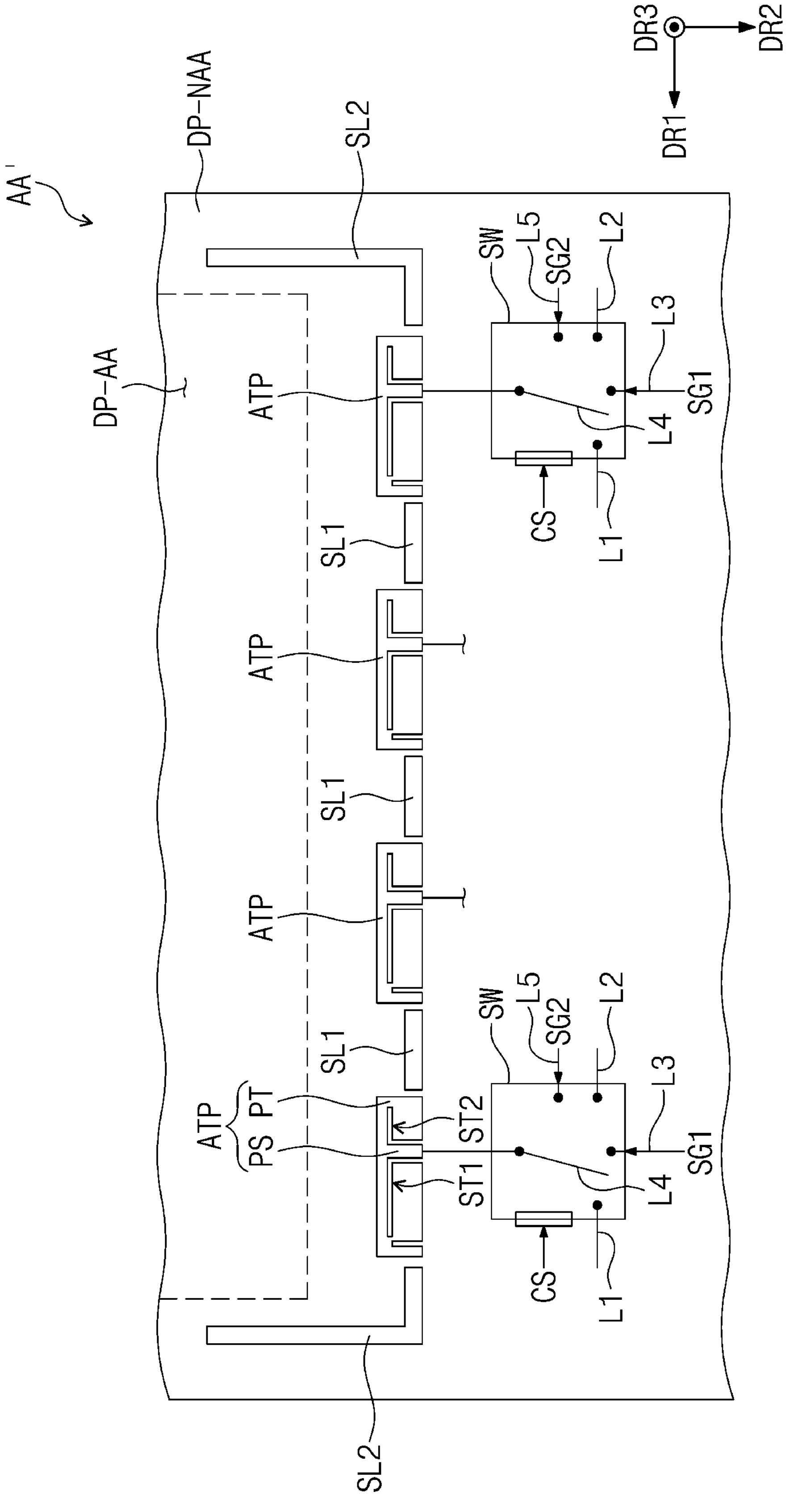
FIG. 8 is an enlarged plan view illustrating region AA' of FIG. 3A, according to an embodiment of the present disclosure.

FIG. 8 is an enlarged plan view illustrating region AA' of FIG. 3A, according to an embodiment of the present disclosure.

Referring to FIG. 8, the plurality of antenna patterns ATP may be disposed in the peripheral region DP-NAA. The plurality of antenna pattern ATP may be arranged in the first direction DR1. Each of the plurality of antenna patterns ATP may include a slot antenna. Although four antenna patterns ATP are illustrated in FIG. 8, the number of antenna patterns, ATP according to an embodiment of the present disclosure, is not necessarily limited thereto.

Under the control of the controller AIC (refer to FIG. 7), the plurality of antenna patterns ATP may operate as an antenna that transmits a signal externally or receives an external signal, or may operate as a gesture sensor that senses a gesture of the object 2000 (refer to FIG. 7).

Each of the plurality of antenna patterns ATP may include a power feeding part PS and a ground electrode PT. The power feeding part PS and the ground electrode PT may transmit and receive a signal at a preset drive frequency. The power feeding part PS and the ground electrode PT may form a slotted loop dipole antenna. The power feeding part PS and the ground electrode PT may include a conductive material. The conductive material may include a metal.

Unlike in the present disclosure, an antenna pattern may be formed of a metal having a mesh structure or a transparent metal such as indium tin oxide (ITO). In the case in which the antenna pattern has the mesh structure, the sheet resistance of the antenna pattern may be increased by the mesh structure having a plurality of openings. Furthermore, in the case in which the antenna pattern has the transparent metal, the antenna pattern may have a relatively low conductivity. In the case in which the antenna pattern has a high sheet resistance or a low conductivity, signal radiation efficiency and gain may be lowered. However, according to the present disclosure, the power feeding part PS and the ground electrode PT may be provided as an integrally formed metal. The sheet resistances of the power feeding part PS and the ground electrode PT may be decreased, and the conductivities thereof may be increased. Accordingly, the power feeding part PS and the ground electrode PT having increased signal radiation efficiency and gain may be provided.

The power feeding part PS may extend in the second direction DR2. The ground electrode PT may be spaced apart from the power feeding part PS in the first direction DR1. A ground voltage may be provided to the ground electrode PT. The ground electrode PT may be connected to the power feeding part PS extending in the second direction DR2.

The ground electrode PT may have a first slot ST1 and a second slot ST2 defined therein, and the first slot ST1 and the second slot ST2 may be spaced apart from each other in the first direction DR1 with the power feeding part PS disposed therebetween. The first slot ST1 and the second slot ST2 may have different areas. However, this is illustrative, and the shapes of the first slot ST1 and the second slot ST2, according to an embodiment of the present disclosure, are not necessarily limited thereto. For example, the first slot ST1 and the second slot ST2 may have the same area.

The display layer DP (refer to FIG. 3A) may further include a first auxiliary electrode SL1. The first auxiliary electrode SL1 may be disposed in the peripheral region DP-NAA.

The first auxiliary electrode SL1 may extend in the first direction DR1. The first auxiliary electrode SL1 may be spaced apart from the plurality of antenna patterns ATP in the first direction DR1. The first auxiliary electrode SL1 may be in a floated state.

A plurality of first auxiliary electrodes SL1 may be provided. Each of the plurality of first auxiliary electrodes SL1 may be disposed between two antenna patterns ATP. Although three first auxiliary electrodes SL1 are illustrated in FIG. 8, the number of first auxiliary electrodes SL1 according to an embodiment of the present disclosure is not necessarily limited thereto.

According to the present disclosure, the first auxiliary electrode SL1 may prevent external static electricity from being introduced into the plurality of antenna patterns ATP. The first auxiliary electrode SL1 may shield static electricity that is likely to be induced into a space between neighboring antenna patterns of the plurality of antenna patterns ATP. The first auxiliary electrode SL1 may prevent the static electricity from causing damage to the plurality of antenna patterns ATP. Furthermore, the first auxiliary electrode SL1 may minimize an influence of electromagnetic waves in the space between neighboring antenna patterns of the plurality of antenna patterns ATP. The first auxiliary electrode SL1 may prevent the electromagnetic waves from affecting gesture sensing of the plurality of antenna patterns ATP. Accordingly, the electronic device DD (refer to FIG. 1) having increased reliability may be provided.

The display layer DP (refer to FIG. 3A) may further include a second auxiliary electrode SL2. The second auxiliary electrode SL2 may be disposed in the peripheral region DP-NAA. The second auxiliary electrode SL2 may be disposed proximate to the active region DP-AA.

The second auxiliary electrode SL2 may extend in the second direction DR2. The second auxiliary electrode SL2 may be spaced apart from the plurality of antenna patterns ATP in the first direction DR1. The second auxiliary electrode SL2 may be in a floated state.

A plurality of second auxiliary electrodes SL2 may be provided. One of the second auxiliary electrodes SL2 may be disposed on one side of the plurality of antenna patterns ATP. The other one of the second auxiliary electrodes SL2 may be disposed on an opposite side of the plurality of antenna patterns ATP. Although two second auxiliary electrodes SL2 are illustrated in FIG. 8, the number of second auxiliary electrodes SL2 according to an embodiment of the present disclosure is not necessarily limited thereto.

According to the present disclosure, the second auxiliary electrode SL2 may prevent external static electricity from being introduced into the plurality of antenna patterns ATP or the plurality of pixels PX (refer to FIG. 3A). The second auxiliary electrode SL2 may shield static electricity that is likely to be induced into a space outside the plurality of antenna patterns ATP. The second auxiliary electrode SL2 may prevent the static electricity from causing damage to the plurality of antenna patterns ATP. Furthermore, the second auxiliary electrode SL2 may minimize an influence of electromagnetic waves in the space outside the plurality of antenna patterns ATP. The second auxiliary electrode SL2 may prevent the electromagnetic waves from affecting gesture sensing of the plurality of antenna patterns ATP. Accordingly, the electronic device DD (refer to FIG. 1) having increased reliability may be provided.

The plurality of switches SW may be disposed in the peripheral region DP-NAA. The plurality of switches SW may be arranged in the first direction DR1. Each of the plurality of switches SW may be connected to at least one of the plurality of antenna patterns ATP. Although FIG. 8 illustrates one example that two switches SW are connected to two antenna patterns ATP among the plurality of antenna patterns ATP, respectively, a connection relationship between the plurality of switches SW and the plurality of antenna patterns ATP according to an embodiment of the present disclosure is not necessarily limited thereto. For example, as many switches SW as the plurality of antenna patterns ATP may be provided, and the switches SW may be connected to the plurality of antenna patterns ATP, respectively.

Each of the plurality of switches SW may receive a control signal CS from the controller AIC (refer to FIG. 7). The control signal CS may be provided using various types of communication standards or protocols, such as inter-integrated circuit (I2C), serial peripheral interface (SPI), and I3C.

Each of the plurality of switches SW may include a first line L1, a second line L2, a third line L3, a fourth line L4, and a fifth line L5. However, this is illustrative, and each of the plurality of switches SW according to an embodiment of the present disclosure may further include a line for receiving an additional signal. Each of the first line L1, the second line L2, the third line L3, the fourth line L4, and the fifth line L5 may be electrically connected to the controller AIC (refer to FIG. 7).

A ground voltage may be provided to the first line L1.

The second line L2 may be in a floated state.

A first signal SG1 having a predetermined frequency may be provided to the third line L3.

A second signal SG2 different from the first signal SG1 may be provided to the fifth line L5. The second signal SG2 may have a frequency different from the frequency of the first signal SG1.

The fourth line L4 may be connected to the power feeding part PS of the antenna pattern ATP connected to the switch SW. The fourth line L4 may be a line that performs a switching operation. The fourth line L4 may be electrically connectable with the first line L1, the second line L2, the third line L3, and the fifth line L5. For example, the fourth line L4 may be selectively electrically connected to the first line L1, the second line L2, the third line L3, and the fifth line L5.

The fourth line L4 may be electrically connected to the first line L1, the second line L2, the third line L3, or the fifth line L5, based on the control signal CS. The antenna pattern ATP may be electrically connected to the first line L1, the second line L2, the third line L3, or the fifth line L5 through the fourth line L4.

When a gesture is sensed, the plurality of switches SW may control the number of TX sensors and the number of RX sensors for optimal gesture sensing according to the object 2000 (refer to FIG. 7) by switching signals provided to the plurality of antenna patterns ATP.

In the case of an antenna pattern ATP not used for gesture sensing, the fourth line L4 may be connected to the first line L1 by the control signal CS. A ground voltage may be provided to the antenna pattern ATP. The antenna pattern ATP to which the ground voltage is provided may operate as a ground electrode for other antenna patterns ATP proximate thereto. Due to this, the signal radiation performance of the other proximate antenna patterns ATP may be increased. The antenna pattern ATP to which the ground voltage is provided may prevent external static electricity from being introduced into the other proximate antenna patterns ATP. The antenna pattern ATP to which the ground voltage is provided may minimize an influence of electromagnetic waves on the other proximate antenna patterns ATP by blocking the electromagnetic waves.

In the case of the antenna pattern ATP not used for gesture sensing, the fourth line L4 may be connected to the second line L2 by the control signal CS. The antenna pattern ATP may be floated. The floated antenna pattern ATP may prevent external static electricity from being introduced into the other proximate antenna patterns ATP. The floated antenna pattern ATP may minimize an influence of electromagnetic waves on the other proximate antenna patterns ATP by blocking the electromagnetic waves.

In the case of an antenna pattern ATP used for gesture sensing, the fourth line L4 may be connected to the third line L3 or the fifth line L5 by the control signal CS. The antenna pattern ATP may operate as a TX sensor or an RX sensor and may sense a gesture of the object 2000 (refer to FIG. 7).

The plurality of antenna patterns ATP may be controlled by the plurality of switches SW so as to be independently driven.

Figure 9:
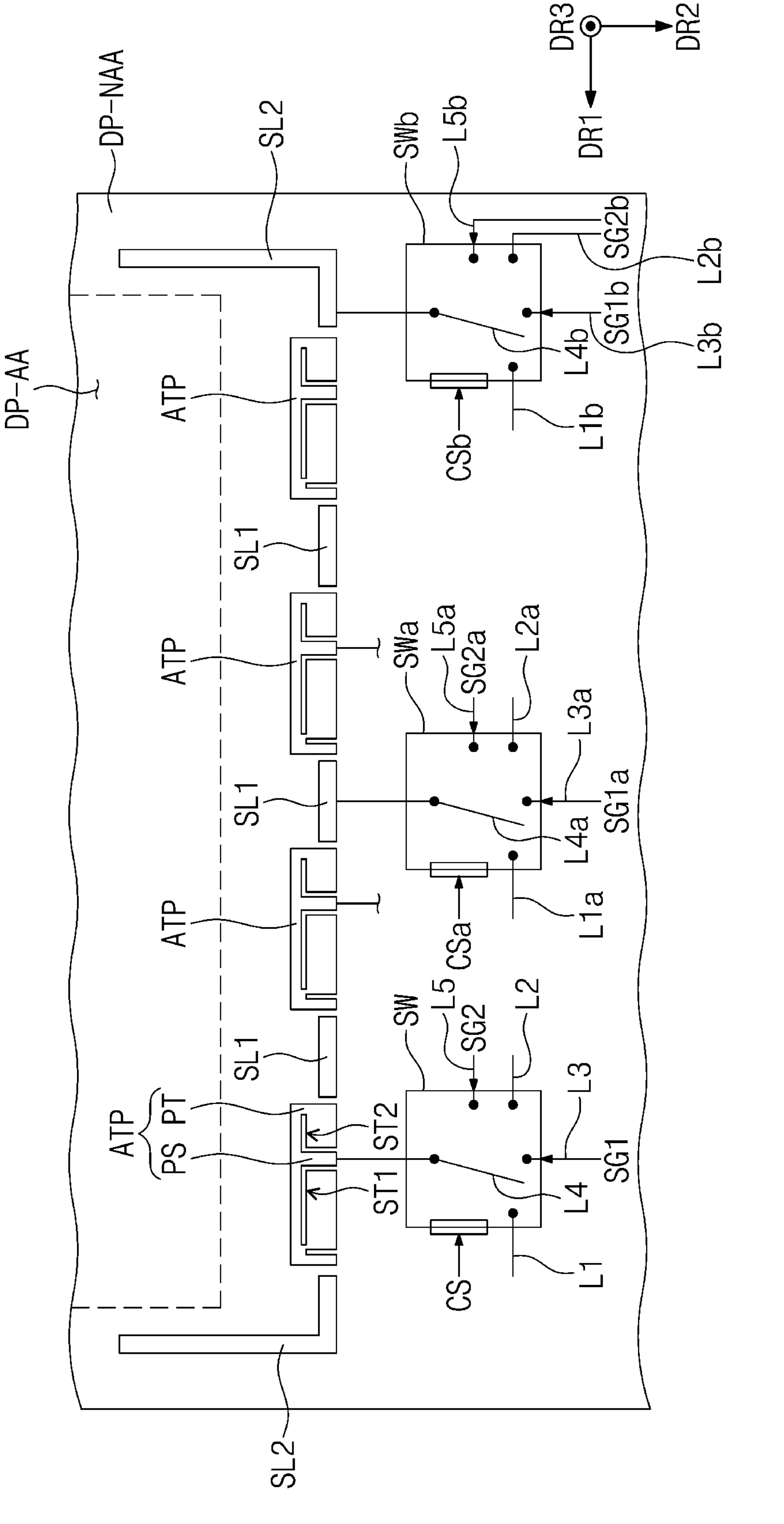
FIG. 9 is a plan view illustrating a region corresponding to region AA' of FIG. 3A, according to an embodiment of the present disclosure.

FIG. 9 is a plan view illustrating a region corresponding to region AA' of FIG. 3A according to an embodiment of the present disclosure. In describing FIG. 9, the components described with reference to FIG. 8 will be assigned with the same reference numerals, and to the extent that a description of these elements is omitted, it may be understood that these elements are at least similar to corresponding elements that are described elsewhere within the specification.

Referring to FIG. 9, the switch array SWA (refer to FIG. 3A) may further include a first auxiliary switch SWa and a second auxiliary switch SWb. A plurality of first auxiliary switches SWa and a plurality of second auxiliary switches SWb may be provided.

The first auxiliary switch SWa and the second auxiliary switch SWb may be disposed in the peripheral region DP-NAA. The first auxiliary switch SWa may be electrically connected to the first auxiliary electrode SL1. The second auxiliary switch SWb may be electrically connected to the second auxiliary electrode SL2.

The first auxiliary switch SWa may receive a control signal CS from the controller AIC (refer to FIG. 3A).

The first auxiliary switch SWa may include a first auxiliary line L1*a*, a second auxiliary line L2*a*, a third auxiliary line L3*a*, a fourth auxiliary line L4*a*, and a fifth auxiliary line L5*a*. Each of the first auxiliary line L1*a*, the second auxiliary line L2*a*, the third auxiliary line L3*a*, the fourth auxiliary line L4*a*, and the fifth auxiliary line L5*a* may be electrically connected to the controller AIC (refer to FIG. 7).

A ground voltage may be provided to the first auxiliary line L1*a*.

The second auxiliary line L2*a* may be in a floated state.

A first signal SG1*a* having a predetermined frequency may be provided to the third auxiliary line L3*a*.

A second signal SG2*a* different from the first signal SG1*a* may be provided to the fifth auxiliary line L5*a*.

The fourth auxiliary line L4*a* may be connected to the first auxiliary electrode SL1. The fourth auxiliary line L4*a* may be a line that performs a switching operation. The fourth auxiliary line L4*a* may be electrically connectable with the first auxiliary line L1*a*, the second auxiliary line L2*a*, the third auxiliary line L3*a*, and the fifth auxiliary line L5*a*. For example, the fourth auxiliary line L4*a* may be selectively connected to the first auxiliary line L1*a*, the second auxiliary line L2*a*, the third auxiliary line L3*a*, and the fifth auxiliary line L5*a*.

The fourth auxiliary line L4*a* may be electrically connected to the first auxiliary line L1*a*, the second auxiliary line L2*a*, the third auxiliary line L3*a*, and the fifth auxiliary line L5*a*, based on the control signal CSa. The first auxiliary electrode SL1 may be electrically connected to the first auxiliary line L1*a*, the second auxiliary line L2*a*, the third auxiliary line L3*a*, or the fifth auxiliary line L5*a* through the fourth auxiliary line L4*a*.

The fourth auxiliary line L4*a* may be connected to the first auxiliary line L1*a* by the control signal CSa. The ground voltage may be provided to the first auxiliary electrode SL1. The first auxiliary electrode SL1 to which the ground voltage is provided may operate as a ground electrode for the proximate antenna patterns ATP. Due to this, the signal radiation performance of the proximate antenna patterns ATP may be increased. The first auxiliary electrode SL1 to which the ground voltage is provided may prevent external static electricity from being introduced into the proximate antenna patterns ATP. The first auxiliary electrode SL1 to which the ground voltage is provided may minimize an influence of electromagnetic waves on the proximate antenna patterns ATP by blocking the electromagnetic waves.

The fourth auxiliary line L4*a* may be connected to the second auxiliary line L2*a* by the control signal CSa. The first auxiliary electrode SL1 may be floated. The floated first auxiliary electrode SL1 may prevent external static electricity from being introduced into the proximate antenna patterns ATP. The floated first auxiliary electrode SL1 may minimize an influence of electromagnetic waves on the proximate antenna patterns ATP by blocking the electromagnetic waves.

The fourth auxiliary line L4*a* may be connected to the third auxiliary line L3*a* or the fifth auxiliary line L5*a* by the control signal CSa.

The first signal SG1*a* or the second signal SG2*a* that has a predetermined frequency may be provided to the first auxiliary electrode SL1.

The first auxiliary electrode SL1 may be coupled with an proximate antenna pattern ATP by the first signal SG1*a* or the second signal SG2*a* and may increase the operating range and signal radiation performance of the antenna pattern ATP. For example, the frequency of the first signal SG1*a* or the second signal SG2*a* may be equal to the frequency of a signal provided to the proximate antenna pattern ATP.

The first auxiliary electrode SL1 may prevent interference in signal transmission/reception of proximate antenna patterns ATP through the first signal SG1*a* or the second signal SG2*a*. For example, when a first signal having a first frequency and a second signal having a second frequency different from the first frequency are provided to two proximate antenna patterns ATP, the first signal SG1*a* or the second signal SG2*a* provided to the first auxiliary electrode SL1 may have a frequency between the first frequency and the second frequency.

The second auxiliary switch SWb may receive a control signal CSb from the controller AIC (refer to FIG. 3A).

The second auxiliary switch SWb may include a first auxiliary line L1*b*, a second auxiliary line L2*b*, a third auxiliary line L3*b*, a fourth auxiliary line L4*b*, and a fifth auxiliary line L5*b*. Each of the first auxiliary line L1*b*, the second auxiliary line L2*b*, the third auxiliary line L3*b*, the fourth auxiliary line L4*b*, and the fifth auxiliary line L5*b* may be electrically connected to the controller AIC (refer to FIG. 7).

A ground voltage may be provided to the first auxiliary line L1*b*.

The second auxiliary line L2*b* may be in a floated state.

A first signal SG1*b* having a predetermined frequency may be provided to the third auxiliary line L3*b*.

A second signal SG2*b* different from the first signal SG1*b* may be provided to the fifth auxiliary line L5*b*.

The fourth auxiliary line L4*b* may be connected to the second auxiliary electrode SL2. The fourth auxiliary line L4*b* may be a line that performs a switching operation. The fourth auxiliary line L4*b* may be electrically connectable with the first auxiliary line L1*b*, the second auxiliary line L2*b*, the third auxiliary line L3*b*, and the fifth auxiliary line L5*b*. For example, the fourth auxiliary line L4*b* may be selectively connected to the first auxiliary line L1*b*, the second auxiliary line L2*b*, the third auxiliary line L3*b*, and the fifth auxiliary line L5*b*.

The fourth auxiliary line L4*b* may be electrically connected to the first auxiliary line L1*b*, the second auxiliary line L2*b*, the third auxiliary line L3*b*, or the fifth auxiliary line L5*b*, based on the control signal CSb. The second auxiliary electrode SL2 may be electrically connected to the first auxiliary line L1*b*, the second auxiliary line L2*b*, the third auxiliary line L3*b*, or the fifth auxiliary line L5*b* through the fourth auxiliary line L4*b*.

The fourth auxiliary line L4*b* may be connected to the first auxiliary line L1*b* by the control signal CSb. The ground voltage may be provided to the second auxiliary electrode SL2. The second auxiliary electrode SL2 to which the ground voltage is provided may operate as a ground electrode for the proximate antenna patterns ATP. Due to this, the signal radiation performance of the proximate antenna patterns ATP may be increased. The second auxiliary electrode SL2 to which the ground voltage is provided may prevent external static electricity from being introduced into the proximate antenna patterns ATP. The second auxiliary electrode SL2 to which the ground voltage is provided may minimize an influence of electromagnetic waves on the proximate antenna patterns ATP by blocking the electromagnetic waves.

The fourth auxiliary line L4*b* may be connected to the second auxiliary line L2*b* by the control signal CSb. The second auxiliary electrode SL2 may be floated. The floated second auxiliary electrode SL2 may prevent external static electricity from being introduced into the proximate antenna patterns ATP. The floated second auxiliary electrode SL2 may minimize an influence of electromagnetic waves on the proximate antenna patterns ATP by blocking the electromagnetic waves.

The fourth auxiliary line L4*b* may be connected to the third auxiliary line L3*b* or the fifth auxiliary line L5*b* by the control signal CSb.

The first signal SG1*b* or the second signal SG2*b* that has a predetermined frequency may be provided to the second auxiliary electrode SL2.

The second auxiliary electrode SL2 may be coupled with an proximate antenna pattern ATP by the first signal SG1*b* or the second signal SG2*b* and may increase the operating range and signal radiation performance of the antenna pattern ATP. For example, the frequency of the first signal SG1*b* or the second signal SG2*b* may be equal to the frequency of a signal provided to the proximate antenna pattern ATP.

The second auxiliary electrode SL2 may prevent interference in signal transmission/reception of proximate antenna patterns ATP through the first signal SG1*b* or the second signal SG2*b*. For example, when a first signal having a first frequency and a second signal having a second frequency different from the first frequency are provided to two proximate antenna patterns ATP, the first signal SG1*b* or the second signal SG2*b* provided to the second auxiliary electrode SL2 may have a frequency between the first frequency and the second frequency.

According to the present disclosure, the plurality of switches SW, SWa, and SWb may control signals or voltages provided to the plurality of antenna patterns ATP, the first auxiliary electrode SL1, and the second auxiliary electrode SL2. The electronic device DD (refer to FIG. 1) may be set to an optimal state for sensing a gesture of the object 2000 (refer to FIG. 7). The electronic device DD (refer to FIG. 1) may sense a gesture of the object 2000 (refer to FIG. 7) by using the plurality of antenna patterns ATP. Accordingly, the electronic device DD (refer to FIG. 1) having increased reliability may be provided.

Figure 10:
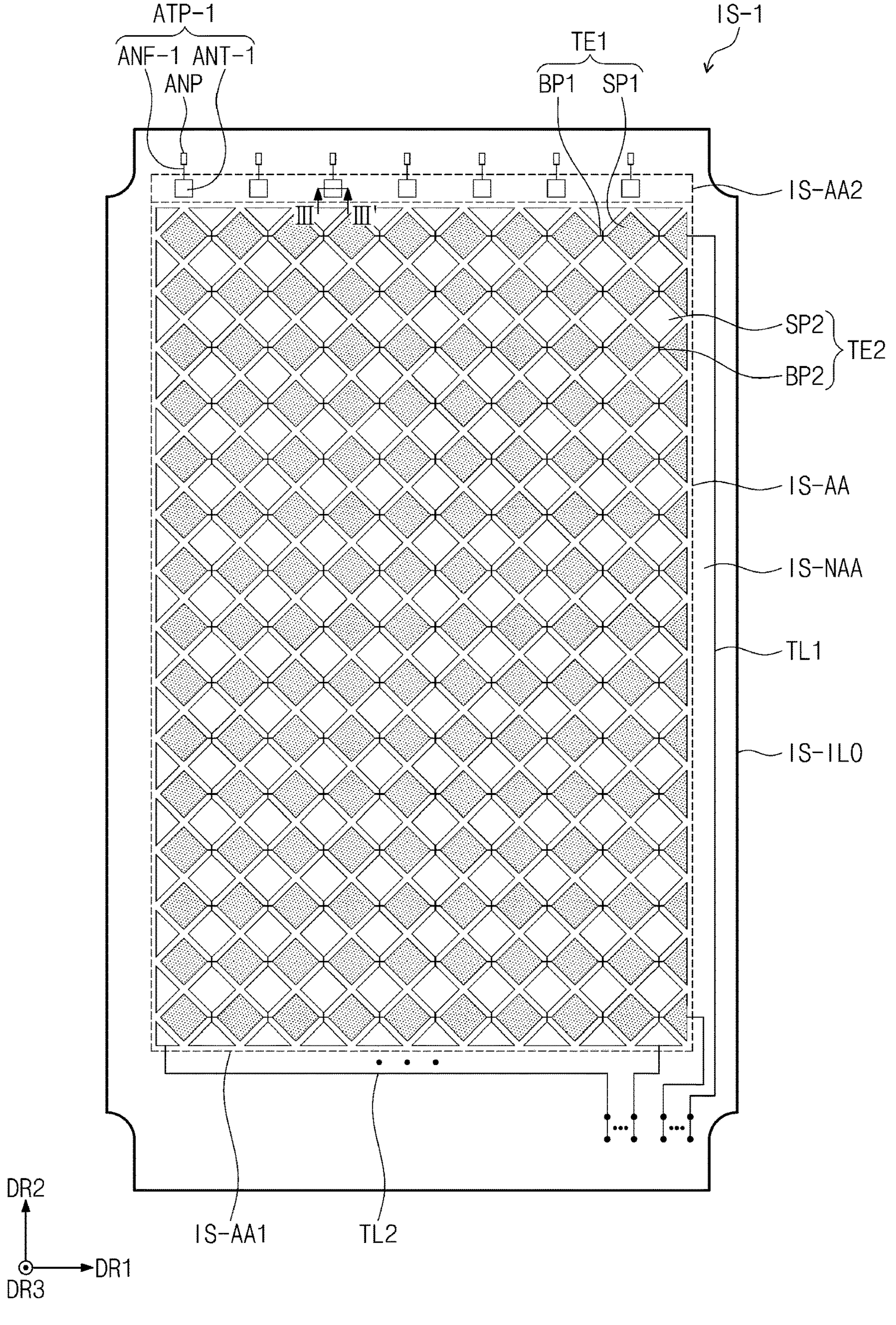
FIG. 10 is a plan view of a sensor layer, according to an embodiment of the present disclosure.
Figure 11:
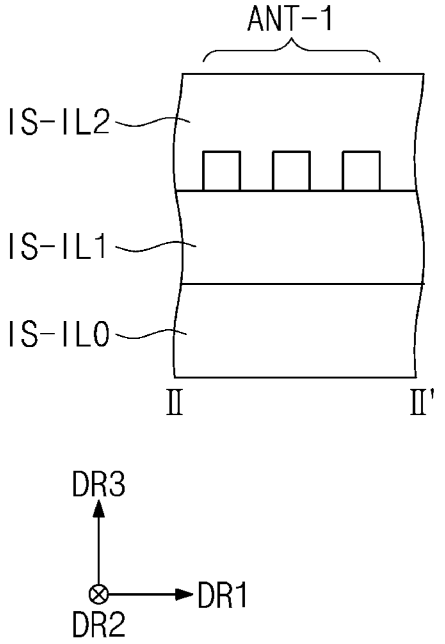
FIG. 11 is a cross-sectional view taken along line of FIG. 10, according to an embodiment of the present disclosure.

FIG. 10 is a plan view of a sensor layer according to an embodiment of the present disclosure, and FIG. 11 is a cross-sectional view taken along line III-III' of FIG. 10 according to an embodiment of the present disclosure. In describing FIGS. 10 and 11, components identical to the components described with reference to FIGS. 5 and 6 will be assigned with the same reference numerals, and to the extent that a description of these elements is omitted, it may be understood that these elements are at least similar to corresponding elements that are described elsewhere within the specification.

Referring to FIGS. 10 and 11, an active region IS-AA and a peripheral region IS-NAA may be defined in the sensor layer IS-1. The active region IS-AA may include a first active region IS-AA1 and a second active region IS-AA2.

A plurality of first sensing electrodes TE1 and a plurality of second sensing electrodes TE2 may be disposed in the first active region IS-AA1.

The second active region IS-AA2 may extend from one side of the first active region IS-AA1. Although FIG. 10 illustrates one example that the second active region IS-AA2 extends from the first active region IS-AA1 in the second direction DR2, the present disclosure is not necessarily limited thereto. For example, the second active region IS-AA2 may extend from the first active region IS-AA1 in the first direction DR1.

A plurality of second active regions IS-AA2 may be provided. In this case, the second active regions IS-AA2 may extend from at least two sides of the first active region IS-AA1. The active region IS-AA may include one first active region IS-AA1 and up to four second active regions IS-AA2. However, this is illustrative, and the active region IS-AA according to an embodiment of the present disclosure is not necessarily limited thereto.

The sensor layer IS-1 may further include a sub-antenna pattern ATP-1. The sub-antenna pattern ATP-1 may be disposed in the second active region IS-AA2. The sub-antenna pattern ATP-1 may include a patch antenna.

A plurality of sub-antenna patterns ATP-1 may be provided. The plurality of sub-antenna patterns ATP-1 may be arranged in the first direction DR1.

Each of the plurality of sub-antenna patterns ATP-1 may include an antenna ANT-1, an antenna line ANF-1, and an antenna pad ANP.

The plurality of antennas ANT-1 may be disposed in the same layer as some of the plurality of sensing electrodes TE1 and TE2. The plurality of antennas ANT-1 may be disposed on a first insulating layer IS-ILL For example, the plurality of antennas ANT-1 may be disposed in the same layer as a plurality of sensing patterns SP1, a plurality of first portions SP2, and a plurality of second portions BP2. However, this is illustrative, and an arrangement relationship between the plurality of antennas ANT-1 according to an embodiment of the present disclosure is not necessarily limited thereto. For example, the plurality of antennas ANT-1 may be disposed in the same layer as a plurality of bridge patterns BP1.

Figure 12:
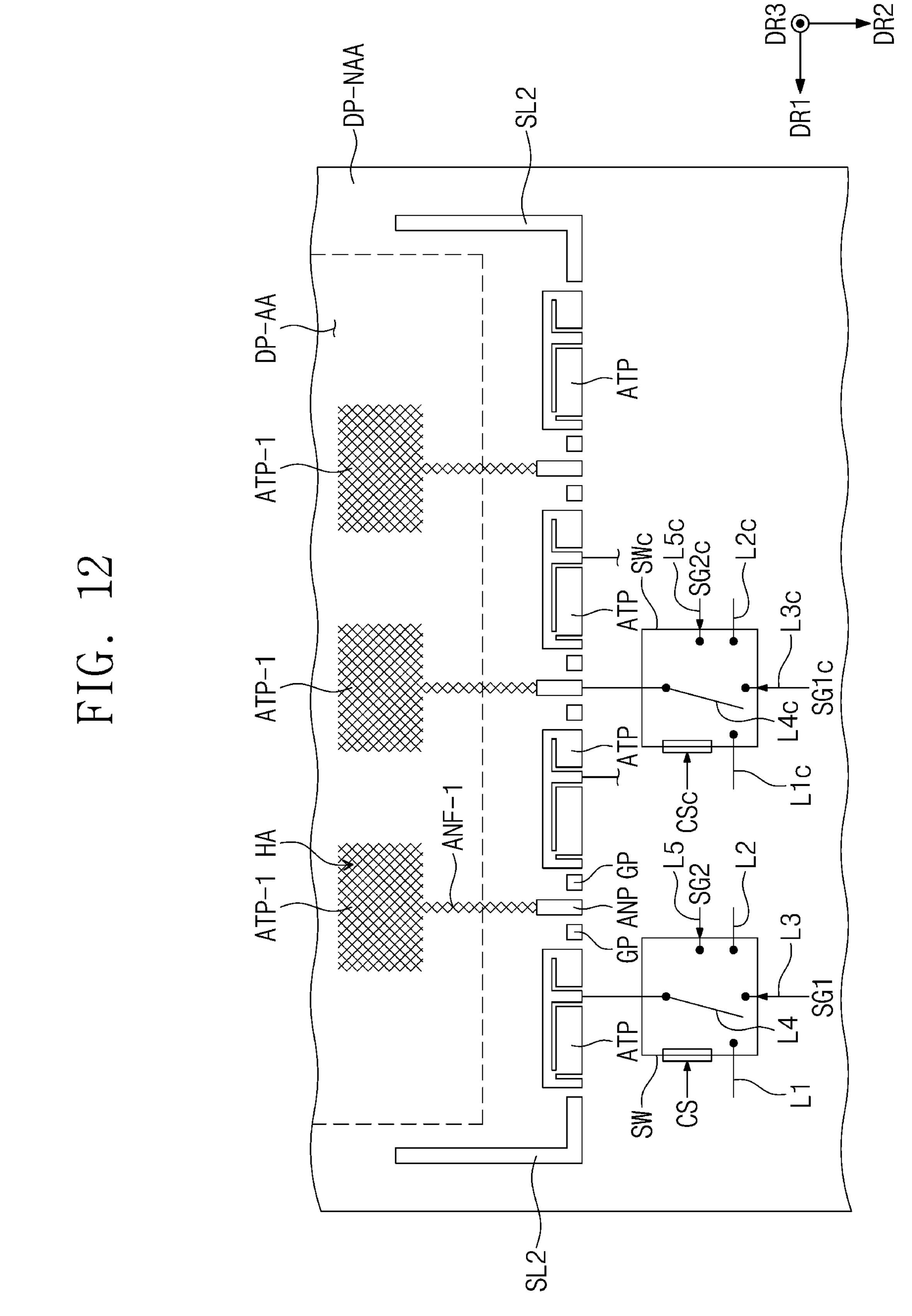
FIG. 12 is a plan view of a portion of the electronic device, according to an embodiment of the present disclosure.

FIG. 12 is a plan view of a portion of the electronic device according to an embodiment of the present disclosure. In describing FIG. 12, components identical to the components described with reference to FIG. 8 will be assigned with the same reference numerals, and to the extent that a description of these elements is omitted, it may be understood that these elements are at least similar to corresponding elements that are described elsewhere within the specification.

Referring to FIGS. 10 and 12, the plurality of antennas ANT-1 may at least partially overlap an active region DP-AA when viewed on the plane. The plurality of antennas ANT-1 may operate in a predetermined frequency band.

The plurality of antenna lines ANF-1 may be connected to sides of the plurality of antennas ANT-1. The plurality of antenna lines ANF-1 may extend from the plurality of antennas ANt-1 toward a peripheral region DP-NAA in the second direction DR2. The plurality of antenna lines ANF-1 may supply power to the plurality of antennas ANT-1.

The plurality of antenna lines ANF-1 may include the same material as the plurality of antennas ANT-1 and may be formed through the same process. The plurality of antennas ANT-1 may include carbon nano tubes, a metal, and/or a metal alloy, or a composite material thereof and may have a single-layer structure, or a multi-layer structure in which titanium (Ti), aluminum (Al), and titanium (Ti) are sequentially stacked. For example, the metallic material may be silver (Ag), copper (Cu), aluminum (Al), gold (Au), and/or platinum (Pt), but is not necessarily limited thereto.

The plurality of antennas ANT-1 and the plurality of antenna lines ANF-1 may have a mesh structure having a plurality of openings HA defined therein. When viewed on the plane, the plurality of pixels PX (refer to FIG. 3A) may be disposed in the plurality of openings HA.

According to the present disclosure, the plurality of pixels PX (refer to FIG. 3A) might not overlap the plurality of antennas ANT-1 on the plane. The plurality of antennas ANT-1 may prevent deterioration in optical characteristics of the display layer DP (refer to FIG. 3A). Accordingly, the electronic device DD (refer to FIG. 1) having increased reliability may be provided.

A plurality of antenna pads ANP may be connected to sides of the plurality of antenna lines ANF. The plurality of antenna pads ANP may be disposed to at least partially overlap the peripheral region DP-NAA.

The sensor layer IS-1 may further include a plurality of ground electrodes GP. The plurality of ground electrodes GP may be disposed proximate to the plurality of antenna pads ANP. The plurality of ground electrodes GP may be spaced apart from each other in the first direction DR1 with one antenna pad ANP disposed therebetween. A ground voltage may be provided to the plurality of ground electrodes GP. The plurality of ground electrodes GP may increase the signal radiation performance of the sub-antenna pattern ATP-1.

Under the control of the controller AIC (refer to FIG. 3A), the sub-antenna patterns ATP-1 may operate as an antenna that transmits a signal externally or receives an external signal, or may operate as a gesture sensor that senses a gesture of the object 2000 (refer to FIG. 7).

The switch array SWA (refer to FIG. 3A) may further include a third auxiliary switch SWc. A plurality of third auxiliary switches SWc may be provided.

The third auxiliary switch SWc may be disposed in the peripheral region DP-NAA. The sub-antenna pattern ATP-1 may be electrically connected to the third auxiliary switch SWc. The plurality of antenna pads ANP may be electrically connected to the plurality of third auxiliary switches SWc of the display layer DP through contact holes.

The third auxiliary switch SWc may receive a control signal CSc from the controller AIC (refer to FIG. 7).

The third auxiliary switch SWc may include a first auxiliary line L1*c*, a second auxiliary line L2*c*, a third auxiliary line L3*c*, a fourth auxiliary line L4*c*, and a fifth auxiliary line L5*c*. Each of the first auxiliary line L1*c*, the second auxiliary line L2*c*, the third auxiliary line L3*c*, the fourth auxiliary line L4*c*, and the fifth auxiliary line L5*c* may be electrically connected to the controller AIC (refer to FIG. 7).

A ground voltage may be provided to the first auxiliary line L1*c*.

The second auxiliary line L2*c* may be in a floated state.

A first signal SG1*c* having a predetermined frequency may be provided to the third auxiliary line L3*c*.

A second signal SG2*c* different from the first signal SG1*c* may be provided to the fifth auxiliary line L5*c*.

The fourth auxiliary line L4*c* may be connected to the antenna pad ANP. The fourth auxiliary line L4*c* may be a line that performs a switching operation. The fourth auxiliary line L4*c* may be electrically connectable with the first auxiliary line L1*c*, the second auxiliary line L2*c*, the third auxiliary line L3*c*, and the fifth auxiliary line L5*c*. For example, the fourth auxiliary line L4*c* may be selectively connected to the first auxiliary line L1*c*, the second auxiliary line L2*c*, the third auxiliary line L3*c*, and the fifth auxiliary line L5*c*.

The fourth auxiliary line L4*c* may be electrically connected to the first auxiliary line L1*c*, the second auxiliary line L2*c*, the third auxiliary line L3*c*, or the fifth auxiliary line L5*c*, based on the control signal CSc. The sub-antenna pattern ATP-1 may be electrically connected to the first auxiliary line L1*c*, the second auxiliary line L2*c*, the third auxiliary line L3*c*, or the fifth auxiliary line L5*c* through the fourth auxiliary line L4*c*.

When a gesture is sensed, the plurality of third auxiliary switches SWc may control the number of TX sensors and the number of RX sensors for optimal gesture sensing according to the object 2000 (refer to FIG. 7) by switching signals provided to the plurality of sub-antenna patterns ATP-1.

In the case of a sub-antenna pattern ATP-1 not used for gesture sensing, the fourth auxiliary line L4*c* may be connected to the first auxiliary line L1*c* by the control signal CSc. The ground voltage may be provided to the sub-antenna pattern ATP-1. The sub-antenna pattern ATP-1 to which the ground voltage is provided may operate as a ground electrode for other sub-antenna patterns ATP-1 proximate thereto. Due to this, the signal radiation performance of the other proximate sub-antenna patterns ATP-1 may be increased. The sub-antenna pattern ATP-1 to which the ground voltage is provided may prevent external static electricity from being introduced into the other proximate sub-antenna patterns ATP-1. The sub-antenna pattern ATP-1 to which the ground voltage is provided may minimize an influence of electromagnetic waves on the other proximate sub-antenna patterns ATP-1 by blocking the electromagnetic waves.

In the case of the sub-antenna pattern ATP-1 not used for gesture sensing, the fourth auxiliary line L4*c* may be connected to the second auxiliary line L2*c* by the control signal CSc. The sub-antenna pattern ATP-1 may be floated. The floated sub-antenna pattern ATP-1 may prevent external static electricity from being introduced into the other proximate sub-antenna patterns ATP-1. The floated sub-antenna pattern ATP-1 may minimize an influence of electromagnetic waves on the other proximate sub-antenna patterns ATP-1 by blocking the electromagnetic waves.

In the case of sub-antenna patterns ATP-1 used for gesture sensing, the fourth auxiliary line L4*c* may be connected to the third auxiliary line L3*c* or the fifth auxiliary line L5*c* by the control signal CSc. The first signal SG1*c* or the second signal SG2*c* may be provided to the sub-antenna patterns ATP-1. The sub-antenna patterns ATP-1 may operate as a TX sensor or an RX sensor and may sense a gesture of the object 2000 (refer to FIG. 7).

Alternatively, the first signal SG1*c* or the second signal SG2*c* may perform control such that the sub-antenna pattern ATP-1 operates as an antenna that transmits a signal externally or receives an external signal. The controller AIC (refer to FIG. 3A) may control operations of the plurality of sub-antenna patterns ATP-1. For example, the controller AIC (refer to FIG. 3A) may adjust beam steering of the plurality of sub-antenna patterns ATP-1 by adjusting power supplied to the plurality of sub-antenna patterns ATP-1 and may increase energy by concentrating a frequency signal in a specific direction. Furthermore, the controller AIC (refer to FIG. 3A) may form a desired radiation pattern, and thus radiation efficiency may be increased.

The first signal SG1*c* or the second signal SG2*c* provided to the plurality of sub-antenna patterns ATP-1 may differ from the first signal SG1 or the second signal SG2 provided to the plurality of antenna patterns ATP. However, this is illustrative, and signals according to an embodiment of the present disclosure are not necessarily limited thereto. For example, the first signal SG1*c* or the second signal SG2*c* provided to the plurality of sub-antenna patterns ATP-1 may be the same as the first signal SG1 or the second signal SG2 provided to the plurality of antenna patterns ATP.

According to the present disclosure, the plurality of switches SW and SWc may control signals or voltages provided to the plurality of antenna patterns ATP and the plurality of sub-antenna patterns ATP-1. The electronic device DD (refer to FIG. 1) may be set to an optimal state for sensing a gesture of the object 2000 (refer to FIG. 7). The electronic device DD (refer to FIG. 1) may sense a gesture of the object 2000 (refer to FIG. 7) by using the plurality of antenna patterns ATP. Accordingly, the electronic device DD (refer to FIG. 1) having increased reliability may be provided.

Figure 13:
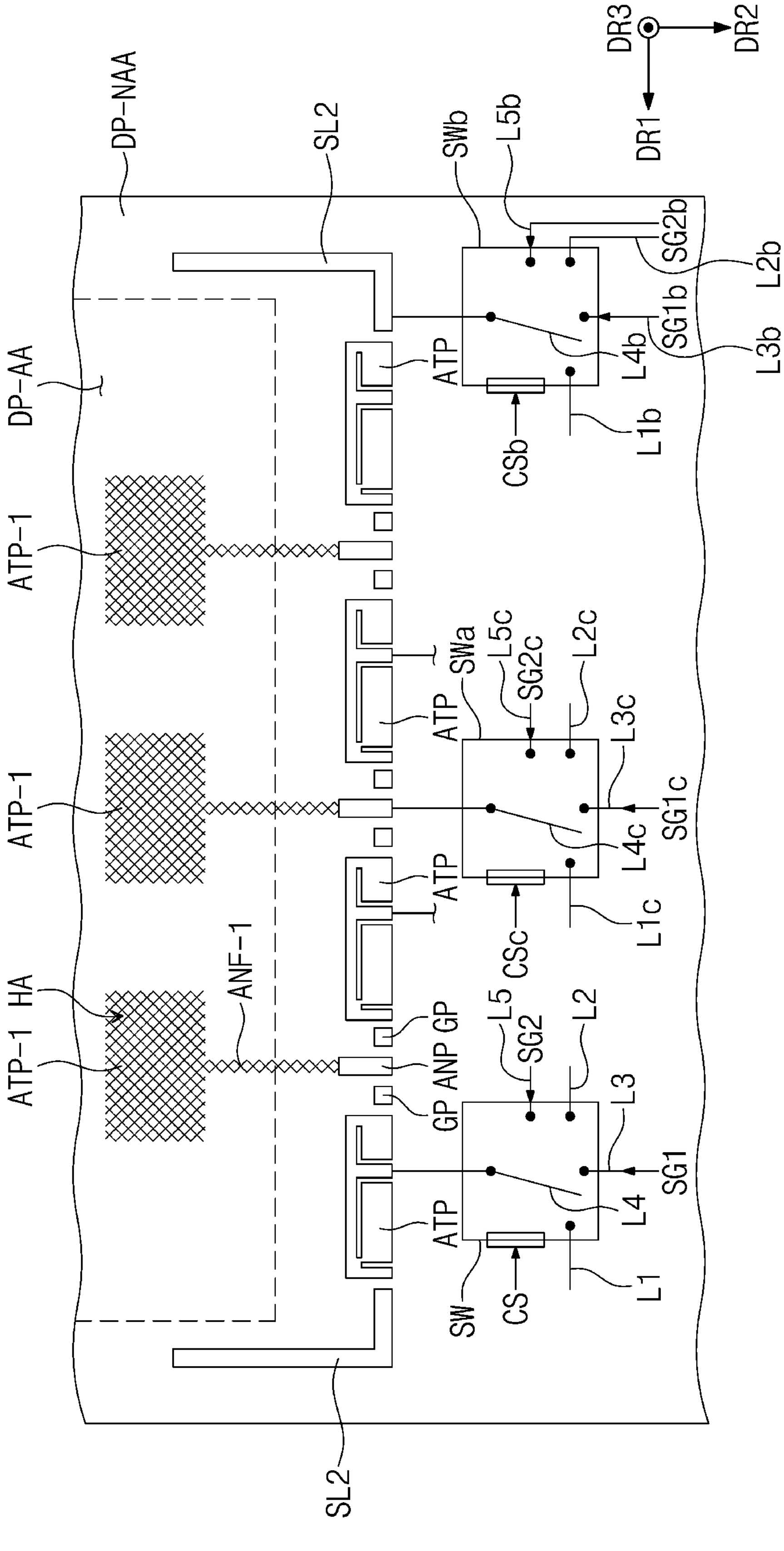
FIG. 13 is a plan view illustrating a portion of the electronic device, according to an embodiment of the present disclosure.

FIG. 13 is a plan view illustrating a portion of the electronic device according to an embodiment of the present disclosure. In describing FIG. 13, the components described with reference to FIGS. 9 and 12 will be assigned with the same reference numerals, and to the extent that a description of these elements is omitted, it may be understood that these elements are at least similar to corresponding elements that are described elsewhere within the.

Referring to FIG. 13, the switch array SWA (refer to FIG. 3A) may be connected to the antenna pattern ATP, the sub-antenna pattern ATP-1, and the second auxiliary electrode SL2. The controller AIC (refer to FIG. 3A) may control the antenna pattern ATP through the switch SW, may control the sub-antenna pattern ATP-1 through the third sub-switch SWc, and may control the second auxiliary electrode SL2 through the second sub-switch SWb.

According to the present disclosure, the plurality of switches SW, SWb, and SWc may control signals or voltages provided to the plurality of antenna patterns ATP, the second auxiliary electrode SL2, and the plurality of sub-antenna patterns ATP-1. The electronic device DD (refer to FIG. 1) may be set to an optimal state for sensing a gesture of the object 2000 (refer to FIG. 7). The electronic device DD (refer to FIG. 1) may sense a gesture of the object 2000 (refer to FIG. 7) by using the plurality of antenna patterns ATP. Accordingly, the electronic device DD (refer to FIG. 1) having increased reliability may be provided.

As described above, the plurality of switches may control signals or voltages provided to the plurality of antenna patterns. The electronic device may be set to an optical state for sensing a gesture of an object. The electronic device may sense a gesture of the object by using the plurality of antenna patterns. Thus, the electronic device having increased reliability may be provided.

While the present disclosure has been described with reference to embodiments thereof, it will be apparent to those of ordinary skill in the art that various changes and modifications may be made thereto without departing from the spirit and scope of the present disclosure.

What is claimed is:

1. An electronic device, comprising:
- a display layer including an active region and a peripheral region proximate to the active region; and
- a controller configured to control the display layer,
- wherein the display layer includes:
  - a plurality of pixels disposed in the active region;
  - a plurality of antenna patterns disposed in the peripheral region and configured to transmit and receive a first signal having a first predetermined frequency; and
  - a switch disposed in the peripheral region and connected to at least one of the plurality of antenna patterns,
- wherein the controller provides, to the switch, a control signal to control the switch, and
- wherein the switch includes:
  - a first line to which a ground voltage is provided;
  - a second line that is floated;
  - a third line to which the first signal is provided; and
  - a fourth line connected to the at least one of the plurality of antenna patterns and electrically connected to the first line, the second line, or the third line based on the control signal.

2. The electronic device of claim 1, wherein the plurality of antenna patterns are arranged in a first direction.

3. The electronic device of claim 1, wherein the switch further includes a fifth line to which a second signal having a frequency different from the first predetermined frequency is provided, and
- wherein the fourth line is selectively electrically connected to the fifth line.

4. The electronic device of claim 1, wherein the display layer further includes a first auxiliary electrode disposed between neighboring antenna patterns of the plurality of antenna patterns.

5. The electronic device of claim 4, wherein the first auxiliary electrode extends in a first direction and is spaced apart from the plurality of antenna patterns in the first direction.

6. The electronic device of claim 4, wherein the first auxiliary electrode is floated.

7. The electronic device of claim 4, wherein the display layer further includes a first auxiliary switch disposed in the peripheral region and connected to the first auxiliary electrode, and
- wherein the first auxiliary switch includes:
  - a first auxiliary line to which a ground voltage is provided;
  - a second auxiliary line that is floated;
  - a third auxiliary line to which a first auxiliary signal having a frequency different from the first predetermined frequency is provided; and
  - a fourth auxiliary line connected to the first auxiliary electrode and electrically connected to the first auxiliary line, the second auxiliary line, or the third auxiliary line based on the control signal.

8. The electronic device of claim 1, wherein the display layer further includes a second auxiliary electrode disposed in the peripheral region and disposed at one end of each of the plurality of antenna patterns.

9. The electronic device of claim 8, wherein the second auxiliary electrode is spaced apart from the plurality of antenna patterns in a first direction and extends in a second direction that crosses the first direction.

10. The electronic device of claim 8, wherein the second auxiliary electrode is floated.

11. The electronic device of claim 8, wherein the display layer further includes a second auxiliary switch disposed in the peripheral region and electrically connected to the second auxiliary electrode, and
- wherein the second auxiliary switch includes:
  - a first auxiliary line to which a ground voltage is provided;

a second auxiliary line that is floated;

a third auxiliary line to which a first auxiliary signal having a frequency different from the first predetermined frequency is provided; and a fourth auxiliary line electrically connected to the second auxiliary electrode and electrically connected to the first auxiliary line, the second auxiliary line, or the third auxiliary line based on the control signal.

12. The electronic device of claim 1, wherein each of the plurality of antenna patterns includes a slot antenna.

13. The electronic device of claim 1, further comprising:

a sensor layer disposed on the display layer, wherein the sensor layer includes:

a plurality of sensing electrodes disposed in the active region; and a sub-antenna pattern disposed in the active region and configured to transmit and receive a sub-signal having a second predetermined frequency.

14. The electronic device of claim 13, wherein the display layer further includes a third auxiliary switch electrically connected to the sub-antenna pattern, and wherein the third auxiliary switch includes:

a first auxiliary line to which a ground voltage is provided;

a second auxiliary line that is floated;

a third auxiliary line to which the sub-signal is provided; and a fourth auxiliary line connected to the sub-antenna pattern and electrically connected to the first auxiliary line, the second auxiliary line, or the third auxiliary line based on the control signal.

15. The electronic device of claim 13, wherein the sub-antenna pattern has a mesh pattern having a plurality of openings defined therein, and wherein the plurality of pixels are disposed in the plurality of openings.

16. The electronic device of claim 13, wherein the sub-antenna pattern includes a patch antenna.

17. The electronic device of claim 1, wherein the plurality of antenna patterns are configured to transmit a first signal and receive a second signal obtained by reflection of the first signal from an object, and wherein the controller is configured to calculate a distance between the object and the electronic device, based on a time delay and/or a frequency difference of the first signal and the second signal.

18. An electronic device, comprising:

a display layer in which an active region and a peripheral region proximate to the active region are defined;

a sensor layer disposed on the display layer;

a controller configured to generate a control signal; and a plurality of switches configured to receive the control signal from the controller, wherein the display layer includes:

a plurality of pixels disposed in the active region; and a plurality of antenna patterns disposed in the peripheral region and arranged in a first direction, the plurality of antenna patterns that is configured to transmit and receive a first signal having a predetermined frequency, wherein each of the plurality of switches includes:

a first line to which a ground voltage is provided;

a second line that is floated;

a third line to which the first signal is provided; and a fourth line electrically connected to the first line, the second line, or the third line based on the control signal, and wherein the fourth line of at least a first switch of the plurality of switches is electrically connected to at least one of the plurality of antenna patterns.

19. The electronic device of claim 18, wherein each of the plurality of switches further includes a fifth line to which a second signal having a frequency different from the predetermined frequency is provided, and wherein the fourth line is selectively electrically connected to the fifth line.

20. The electronic device of claim 18, wherein the display layer further includes a first auxiliary electrode disposed between neighboring antenna patterns of the plurality of antenna patterns.

21. The electronic device of claim 20, wherein the first auxiliary electrode is floated.

22. The electronic device of claim 20, wherein the first auxiliary electrode extends in the first direction and is spaced apart from the plurality of antenna patterns.

23. The electronic device of claim 20, wherein the first auxiliary electrode is electrically connected to the fourth line of a second switch of the plurality of switches.

24. The electronic device of claim 18, wherein the display layer further includes a second auxiliary electrode disposed in the peripheral region and disposed at one end of each of the plurality of antenna patterns.

25. The electronic device of claim 24, wherein the second auxiliary electrode is floated.

26. The electronic device of claim 24, wherein the second auxiliary electrode is electrically connected to the fourth line of a second switch of the plurality of switches.

27. The electronic device of claim 24, wherein the second auxiliary electrode extends in a second direction that crosses the first direction and is spaced apart from the plurality of antenna patterns.

28. The electronic device of claim 18, wherein the sensor layer includes:

a plurality of sensing electrodes disposed in the active region; and a sub-antenna pattern disposed in the active region and configured to transmit and receive a sub-signal having a predetermined frequency.

29. The electronic device of claim 28, wherein the sub-antenna pattern is electrically connected to the fourth line of a second switch of the plurality of switches.

30. The electronic device of claim 18, wherein the plurality of antenna patterns are configured to transmit a frequency-modulated signal and receive the frequency-modulated signal reflected from an object, and wherein the controller is configured to calculate a distance between the object and the electronic device, based on a time delay and/or a frequency difference between transmission and reception of the frequency-modulated signal.

* * * * *